United States Patent
Yu et al.

(10) Patent No.: US 12,537,954 B2
(45) Date of Patent: Jan. 27, 2026

(54) BYPASS ALIGNMENT IN VIDEO CODING

(71) Applicant: GUANGDONG OPPO MOBILE TELECOMMUNICATIONS CORP., LTD., Dongguan (CN)

(72) Inventors: Yue Yu, Palo Alto, CA (US); Haoping Yu, Palo Alto, CA (US)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 90 days.

(21) Appl. No.: 18/288,248

(22) PCT Filed: Apr. 25, 2022

(86) PCT No.: PCT/US2022/026211
§ 371 (c)(1),
(2) Date: Oct. 25, 2023

(87) PCT Pub. No.: WO2022/232061
PCT Pub. Date: Nov. 3, 2022

(65) Prior Publication Data
US 2024/0214585 A1   Jun. 27, 2024

Related U.S. Application Data

(60) Provisional application No. 63/216,447, filed on Jun. 29, 2021, provisional application No. 63/215,862,
(Continued)

(51) Int. Cl.
*H04N 7/12* (2006.01)
*H04N 19/117* (2014.01)
(Continued)

(52) U.S. Cl.
CPC ......... *H04N 19/124* (2014.11); *H04N 19/117* (2014.11); *H04N 19/132* (2014.11);
(Continued)

(58) Field of Classification Search
CPC .................................................. H04N 19/13
See application file for complete search history.

(56) References Cited

U.S. PATENT DOCUMENTS 5,802,213 A    9/1998  Gardos
2013/0177069 A1   7/2013  Sze
(Continued)

FOREIGN PATENT DOCUMENTS

WO    2020064745 A1    4/2020
WO    2021040487 A1    3/2021

OTHER PUBLICATIONS

International Search Report in the international application No. PCT/US2022/026216, mailed on Sep. 8, 2022. 2 pages.
(Continued)

*Primary Examiner* — Y Lee
(74) *Attorney, Agent, or Firm* — BAYES PLLC

(57) ABSTRACT

In certain aspects, a method and system for encoding a picture of a video including a coding block, and a method and system for decoding a picture of a video including a coding block are provided. In the method for encoding a picture of a video, a coefficient of each position in the coding block to is quantized by a processor to generate a quantization level of the respective position. A high throughput mode is enabled. In the high throughput mode, at least one residual coding bin of the coding block is changed from a context-coded bin to a bypass-coded bin, and bypass bit-alignment is applied. The quantization levels of the coding block are encoded by the processor into a bitstream in the high throughput mode.

20 Claims, 17 Drawing Sheets

Related U.S. Application Data filed on Jun. 28, 2021, provisional application No. 63/180,007, filed on Apr. 26, 2021.

(51) Int. Cl.
| | |
|---|---|
| *H04N 19/124* | (2014.01) |
| *H04N 19/132* | (2014.01) |
| *H04N 19/176* | (2014.01) |
| *H04N 19/18* | (2014.01) |
| *H04N 19/184* | (2014.01) |
| *H04N 19/46* | (2014.01) |
| *H04N 19/60* | (2014.01) |

(52) U.S. Cl.
CPC ............ *H04N 19/176* (2014.11); *H04N 19/18* (2014.11); *H04N 19/184* (2014.11); *H04N 19/46* (2014.11); *H04N 19/60* (2014.11)

(56) References Cited

U.S. PATENT DOCUMENTS

| | | |
|---|---|---|
| 2013/0182757 A1 | 7/2013 | Karczewicz |
| 2019/0089959 A1 | 3/2019 | Berry |

OTHER PUBLICATIONS

International Search Report in the international application No. PCT/US2022/026211, mailed on Sep. 1, 2022. 2 pages.
Written Opinion of the International Search Authority in the international application No. PCT/US2022/026216, mailed on Sep. 8, 2022. 4 pages.
Written Opinion of the International Search Authority in the international application No. PCT/US2022/026211, mailed on Sep. 1, 2022. 4 pages.
Benjamin Bross et al, "Versatile Video Coding Editorial Refinements on Draft 10", Joint Video Experts Team (JVET) of ITU-T SG 16 WP 3 and ISO/IEC JTC 1/SC 29, JVET-T2001-v2, 20th Meeting, by teleconference, Oct. 7-16, 2020, pp. 12-513. 514 pages.
"High efficiency video coding", Series H: Audiovisual and Multimedia Systems Infrastructure of audiovisual services-Coding of moving video, Telecommunication Standardization Sector of ITU, ITU-T, H.265, (Nov. 2019), pp. 12-264. 712 pages.
Fan Wang et al, "AHG8: a full-bypass mode in residual coding for high bit depth and high bit rate extensions", Joint Video Experts Team (JVET) of ITU-T SG 16 WP 3 and ISO/IEC JTC 1/SC 29, JVET-V0122-v2, 22nd Meeting, by teleconference, Apr. 20-28, 2021, the whole document. 8 pages.
Mohammed Golam Sarwer et al, "AHG8: CABAC-bypass alignment for high bit-depth coding", Joint Video Experts Team (JVET) of ITU-T SG 16 WP 3 and ISO/IEC JTC 1/SC 29, JVET-V0059-v2, 22nd Meeting, by teleconference, Apr. 20-28, 2021, the whole document. 13 pages.
Wang (Oppo) F et al: "AHG8: a combination of JVET-V0059 option 2 and JVET-V0122 for high bit depth and high bit rate extensions", 22. JVET Meeting; Apr. 20, 2021-Apr. 28, 2021; Teleconference; (The Joint Video Exploration Team of ISO/IEC JTC1/SC29/WG11 and ITU-T SG.16 ), No. JVET-V0178; m56945, Apr. 27, 2021 (Apr. 27, 2021), XP030294422, the whole document.
Wang (Oppo) F et al: "CE-3.2: a high throughput mode for high bit depth and high bit rate extensions", 135. MPEG Meeting; Jul. 12, 2021-Jul. 16, 2021; Online; (Motion Picture Expert Group or ISO/IEC JTC1/SC29/WG11), No. JVET-W0045; m57098; JVET-W0045; m57098, Jun. 26, 2021 (Jun. 26, 2021), XP030296626, the whole document.
Tsukuba (Sony) T et al: "CE-related: High throughput mode for high bit-depth coding harmonization of CE-3.2 and CE-1.1", 23. JVET Meeting; Jul. 7, 2021-Jul. 16, 2021; Teleconference; <The Joint Video Exploration Team of ISO/IEC JTC1/SC29/WG11 and ITU-T SG.16 >, No. JVET-W0114; m57231, Jul. 12, 2021 (Jul. 12, 2021), XP030296094, the whole document.
Sarwer (Alibaba-Inc)M G et al: "AHG8: CABAC-bypass alignment for high bit-depth coding", 21. JVET Meeting; Jan. 6, 2021-Jan. 15, 2021; Teleconference; (The Joint Video Exploration Team of ISO/IEC JTC1/SC29/WG11 and ITU-T SG.16 ), No. JVET-U0069, Jan. 8, 2021 (Jan. 8, 2021), XP030293155, abstract; figures 3, 4, paragraphs [0002], [0003].
Supplementary European Search Report in the European application No. 22796510.0, mailed on Jan. 23, 2025. 16 pages.
Supplementary European Search Report in the European application No. 22796507.6, mailed on Jan. 20, 2025. 15 pages.
Non Final Office Action of the U.S. Appl. No. 18/287,641, issued on Jun. 4, 2025. 17 pages.

100

200

BYPASS ALIGNMENT IN VIDEO CODING

CROSS-REFERENCE TO RELATED APPLICATIONS

This application is a national stage application of International Application No. PCT/US2022/026211, filed on Apr. 25, 2022, which claims the benefit of priorities to U.S. Provisional Application No. 63/180,007, filed on Apr. 26, 2021, U.S. Provisional Application No. 63/215,862, filed on Jun. 28, 2021, and U.S. Provisional Application No. 63/216,447, filed on Jun. 29, 2021, all of which are incorporated by reference herein in their entireties.

BACKGROUND

Embodiments of the present disclosure relate to video coding.

Digital video has become mainstream and is being used in a wide range of applications including digital television, video telephony, and teleconferencing. These digital video applications are feasible because of the advances in computing and communication technologies as well as efficient video coding techniques. Various video coding techniques may be used to compress video data, such that coding on the video data can be performed using one or more video coding standards. Exemplary video coding standards may include, but not limited to, versatile video coding (H.266/VVC), high-efficiency video coding (H.265/HEVC), advanced video coding (H.264/AVC), moving picture expert group (MPEG) coding, to name a few.

SUMMARY

According to one aspect of the present disclosure, a method for encoding a picture of a video including a coding block is disclosed. A coefficient of each position in the coding block is quantized by a processor to generate a quantization level of the respective position. A high throughput mode is enabled. In the high throughput mode, at least one residual coding bin of the coding block is changed from a context-coded bin to a bypass-coded bin, and bypass bit-alignment is applied. The quantization levels of the coding block are encoded by the processor into a bitstream in the high throughput mode.

According to another aspect of the present disclosure, a system for encoding a picture of a video including a coding block includes a memory configured to store instructions and a processor coupled to the memory. The processor is configured to, upon executing the instructions, quantize a coefficient of each position in the coding block to generate a quantization level of the respective position. The processor is also configured to, upon executing the instructions, enable a high throughput mode. In the high throughput mode, at least one residual coding bin of the coding block is changed from a context-coded bin to a bypass-coded bin, and bypass bit-alignment is applied. The processor is further configured to, upon executing the instructions, encode the quantization levels of the coding block into a bitstream in the high throughput mode.

According to still another aspect of the present disclosure, a non-transitory computer-readable medium storing instructions that, when executed by a processor, perform a process for encoding a picture of a video including a coding block is disclosed. The process includes quantizing a coefficient of each position in the coding block to generate a quantization level of the respective position. The process also includes enabling a high throughput mode. In the high throughput mode, at least one residual coding bin of the coding block is changed from a context-coded bin to a bypass-coded bin, and bypass bit-alignment is applied. The process further includes encoding the quantization levels of the coding block into a bitstream in the high throughput mode.

According to yet another aspect of the present disclosure, a method for decoding a picture of a video including a coding block is disclosed. A high throughput mode is enabled. In the high throughput mode, at least one residual coding bin of the coding block is changed from a context-coded bin to a bypass-coded bin, and bypass bit-alignment is applied. A bitstream is decoded by a processor to obtain a quantization level of each position in the coding block in the high throughput mode. The quantization levels of the coding block are dequantized to generate a coefficient of each position in the coding block.

According to yet another aspect of the present disclosure, a system for decoding a picture of a video including a coding block includes a memory configured to store instructions and a processor coupled to the memory. The processor is configured to, upon executing the instructions, enable a high throughput mode. In the high throughput mode, at least one residual coding bin of the coding block is changed from a context-coded bin to a bypass-coded bin, and bypass bit-alignment is applied. The processor is also configured to, upon executing the instructions, decode a bitstream to obtain a quantization level of each position in the coding block in the high throughput mode. The processor is further configured to, upon executing the instructions, dequantize the quantization levels of the coding block to generate a coefficient of each position in the coding block.

According to yet another aspect of the present disclosure, a non-transitory computer-readable medium storing instructions that, when executed by a processor, perform a process for decoding a picture of a video including a coding block is disclosed. The process includes enabling a high throughput mode. In the high throughput mode, at least one residual coding bin of the coding block is changed from a context-coded bin to a bypass-coded bin, and bypass bit-alignment is applied. The process also includes decoding a bitstream to obtain a quantization level of each position in the coding block in the high throughput mode. The process further includes dequantizing the quantization levels of the coding block to generate a coefficient of each position in the coding block.

These illustrative embodiments are mentioned not to limit or define the present disclosure, but to provide examples to aid understanding thereof. Additional embodiments are described in the Detailed Description, and further description is provided there.

BRIEF DESCRIPTION OF THE DRAWINGS

The accompanying drawings, which are incorporated herein and form a part of the specification, illustrate embodiments of the present disclosure and, together with the description, further serve to explain the principles of the present disclosure and to enable a person skilled in the pertinent art to make and use the present disclosure.

Figure 1:
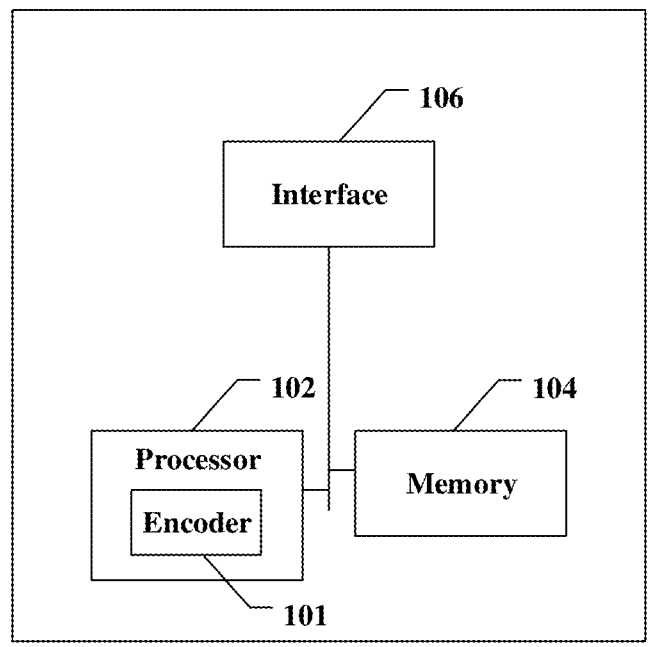
FIG. 1 illustrates a block diagram of an exemplary encoding system, according to some embodiments of the present disclosure.

Embodiments of the present disclosure will be described with reference to the accompanying drawings.

DETAILED DESCRIPTION

Although some configurations and arrangements are discussed, it should be understood that this is done for illustrative purposes only. A person skilled in the pertinent art will recognize that other configurations and arrangements can be used without departing from the spirit and scope of the present disclosure. It will be apparent to a person skilled in the pertinent art that the present disclosure can also be employed in a variety of other applications.

It is noted that references in the specification to "one embodiment," "an embodiment," "an example embodiment," "some embodiments," "certain embodiments," etc., indicate that the embodiment described may include a particular feature, structure, or characteristic, but every embodiment may not necessarily include the particular feature, structure, or characteristic. Moreover, such phrases do not necessarily refer to the same embodiment. Further, when a particular feature, structure, or characteristic is described in connection with an embodiment, it would be within the knowledge of a person skilled in the pertinent art to effect such feature, structure, or characteristic in connection with other embodiments whether or not explicitly described.

In general, terminology may be understood at least in part from usage in context. For example, the term "one or more" as used herein, depending at least in part upon context, may be used to describe any feature, structure, or characteristic in a singular sense or may be used to describe combinations of features, structures or characteristics in a plural sense. Similarly, terms, such as "a," "an," or "the," again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

Various aspects of video coding systems will now be described with reference to various apparatus and methods. These apparatus and methods will be described in the following detailed description and illustrated in the accompanying drawings by various modules, components, circuits, steps, operations, processes, algorithms, etc. (collectively referred to as "elements"). These elements may be implemented using electronic hardware, firmware, computer software, or any combination thereof. Whether such elements are implemented as hardware, firmware, or software depends upon the particular application and design constraints imposed on the overall system.

The techniques described herein may be used for various video coding applications. As described herein, video coding includes both encoding and decoding a video. Encoding and decoding of a video can be performed by the unit of block. For example, an encoding/decoding process such as transform, quantization, prediction, in-loop filtering, reconstruction, or the like may be performed on a coding block, a transform block, or a prediction block. As described herein, a block to be encoded/decoded will be referred to as a "current block." For example, the current block may represent a coding block, a transform block, or a prediction block according to a current encoding/decoding process. In addition, it is understood that the term "unit" used in the present disclosure indicates a basic unit for performing a specific encoding/decoding process, and the term "block" indicates a sample array of a predetermined size. Unless otherwise stated, the "block" and "unit" may be used interchangeably.

In video coding, quantization is used to reduce the dynamic range of transformed or non-transformed video signals so that fewer bits will be used to represent video signals. Before quantization, the transformed or non-transformed video signal at a specific position is referred to as a "coefficient." After quantization, the quantized value of the coefficient is referred to as a "quantization level" or "level." In the present disclosure, a quantization level of a position refers to the quantization level of a coefficient at the position. Residual coding is used to convert the quantization levels of positions into a bitstream in video coding. After quantization, there are N×M quantization levels for an N×M coding block. These N×M quantization levels may be zero or non-zero values. The non-zero levels will further be binarized to binary bins if the levels are not binary.

For example, context-adaptive modeling based binary arithmetic coding (CABAC) for H.266/VVC, H.265/HEVC, and H.264/AVC use bins to code quantization levels of positions into bits. There are two kinds of context modeling-based coding approaches used by CABAC. The context-based approach updates the context model adaptively according to the neighboring coded information; bins coded in this way are called context-coded bins (CCBs). In contrast, the other bypass approach assumes the probability of 1 or 0 is always 50% and therefore always uses a fixed context modeling without adaptation; bins coded by this approach are called bypass-coded bins (BCBs).

For high bit-depth and high bit-rate video coding, the throughput becomes a more serious issue. The coding using context-coded bins, however, requires relatively complex hardware implementations and reduces the throughput of video coding in general, compared with coding bypass-coded bins and thus, has become a bottleneck for improving the throughput of high bit-depth and high bit-rate video coding.

To improve the throughput of video coding, in particular, high bit-depth and high bit-rate video coding, the present disclosure provides various schemes of bypass coding and bit-alignment in video coding. A high throughput mode can be enabled during residual coding as needed, for example, for applications requiring high bit-depth and high bit-rate video coding to obtain a better throughput.

In some embodiments, some or all of the context-coded bins for residual coding can be changed to bypass-coded bins in the high throughput mode. In some embodiments, some or all of the context-coded bins for residual coding can be skipped in the high throughput mode. As a result, only bypass-coded bins may be used for residual coding in the high throughput mode.

Moreover, bypass bit-alignment can be applied in the high throughput mode to further improve the throughput of bypass coding because the bypass coding can be implemented with a shift operation instead of going through regular CABAC operations after the application of the bit-alignment, which can enable simultaneously coding using multiple bypass-coded bins. Bypass bit-alignment can be invoked at different stages of residual coding as needed in the high throughput mode, such as the beginning of the coding process of the current coding block, the beginning of the coding process of the transform unit, etc.

The high throughput mode can be enabled at various levels during residual coding as needed, such as the coding block level or the transform unit level. The high throughput mode can be further extended beyond residual coding to some or all other context-coded bins used in video coding, for example, the motion vector related bins.

Figure 2:
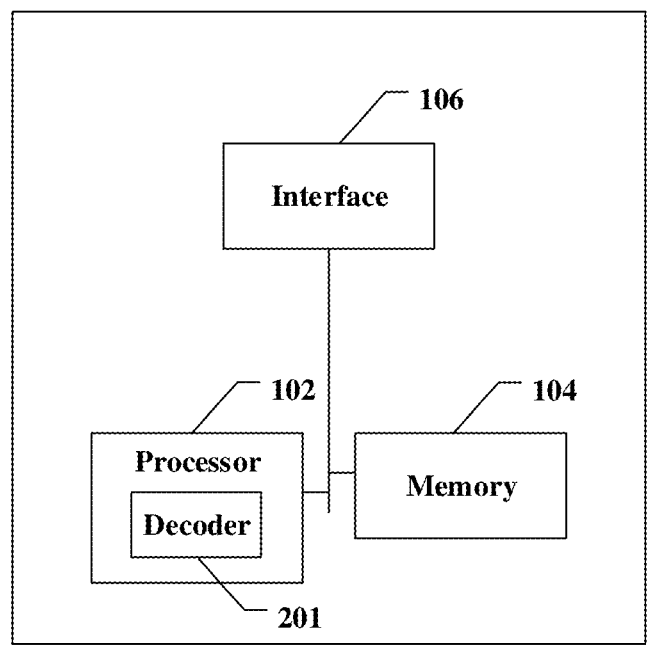
FIG. 2 illustrates a block diagram of an exemplary decoding system, according to some embodiments of the present disclosure.

FIG. 1 illustrates a block diagram of an exemplary encoding system 100, according to some embodiments of the present disclosure. FIG. 2 illustrates a block diagram of an exemplary decoding system 200, according to some embodiments of the present disclosure. Each system 100 or 200 may be applied or integrated into various systems and apparatus capable of data processing, such as computers and wireless communication devices. For example, system 100 or 200 may be the entirety or part of a mobile phone, a desktop computer, a laptop computer, a tablet, a vehicle computer, a gaming console, a printer, a positioning device, a wearable electronic device, a smart sensor, a virtual reality (VR) device, an argument reality (AR) device, or any other suitable electronic devices having data processing capability. As shown in FIGS. 1 and 2, system 100 or 200 may include a processor 102, a memory 104, and an interface 106. These components are shown as connected to one another by a bus, but other connection types are also permitted. It is understood that system 100 or 200 may include any other suitable components for performing functions described here.

Processor 102 may include microprocessors, such as graphic processing unit (GPU), image signal processor (ISP), central processing unit (CPU), digital signal processor (DSP), tensor processing unit (TPU), vision processing unit (VPU), neural processing unit (NPU), synergistic processing unit (SPU), or physics processing unit (PPU), microcontroller units (MCUs), application-specific integrated circuits (ASICs), field-programmable gate arrays (FPGAs), programmable logic devices (PLDs), state machines, gated logic, discrete hardware circuits, and other suitable hardware configured to perform the various functions described throughout the present disclosure. Although only one processor is shown in FIGS. 1 and 2, it is understood that multiple processors can be included. Processor 102 may be a hardware device having one or more processing cores. Processor 102 may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. Software can include computer instructions written in an interpreted language, a compiled language, or machine code. Other techniques for instructing hardware are also permitted under the broad category of software.

Memory 104 can broadly include both memory (a.k.a, primary/system memory) and storage (a.k.a., secondary memory). For example, memory 104 may include random-access memory (RAM), read-only memory (ROM), static RAM (SRAM), dynamic RAM (DRAM), ferro-electric RAM (FRAM), electrically erasable programmable ROM (EEPROM), compact disc read-only memory (CD-ROM) or other optical disk storage, hard disk drive (HDD), such as magnetic disk storage or other magnetic storage devices, Flash drive, solid-state drive (SSD), or any other medium that can be used to carry or store desired program code in the form of instructions that can be accessed and executed by processor 102. Broadly, memory 104 may be embodied by any computer-readable medium, such as a non-transitory computer-readable medium. Although only one memory is shown in FIGS. 1 and 2, it is understood that multiple memories can be included.

Interface 106 can broadly include a data interface and a communication interface that is configured to receive and transmit a signal in a process of receiving and transmitting information with other external network elements. For example, interface 106 may include input/output (I/O) devices and wired or wireless transceivers. Although only one memory is shown in FIGS. 1 and 2, it is understood that multiple interfaces can be included.

Processor 102, memory 104, and interface 106 may be implemented in various forms in system 100 or 200 for performing video coding functions. In some embodiments, processor 102, memory 104, and interface 106 of system 100 or 200 are implemented (e.g., integrated) on one or more system-on-chips (SoCs). In one example, processor 102, memory 104, and interface 106 may be integrated on an application processor (AP) SoC that handles application processing in an operating system (OS) environment, including running video encoding and decoding applications. In another example, processor 102, memory 104, and interface 106 may be integrated on a specialized processor chip for video coding, such as a GPU or ISP chip dedicated to image and video processing in a real-time operating system (RTOS).

As shown in FIG. 1, in encoding system 100, processor 102 may include one or more modules, such as an encoder 101. Although FIG. 1 shows that encoder 101 is within one processor 102, it is understood that encoder 101 may include one or more sub-modules that can be implemented on different processors located closely or remotely with each other. Encoder 101 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to video encoding, such as picture partitioning, inter prediction, intra prediction, transformation, quantization, filtering, entropy encoding, etc., as described below in detail.

Similarly, as shown in FIG. 2, in decoding system 200, processor 102 may include one or more modules, such as a decoder 201. Although FIG. 2 shows that decoder 201 is within one processor 102, it is understood that decoder 201 may include one or more sub-modules that can be implemented on different processors located closely or remotely with each other. Decoder 201 (and any corresponding sub-modules or sub-units) can be hardware units (e.g., portions of an integrated circuit) of processor 102 designed for use with other components or software units implemented by processor 102 through executing at least part of a program, i.e., instructions. The instructions of the program may be stored on a computer-readable medium, such as memory 104, and when executed by processor 102, it may perform a process having one or more functions related to video decoding, such as entropy decoding, inverse quantization, inverse transformation, inter prediction, intra prediction, filtering, as described below in detail.

Figure 3:
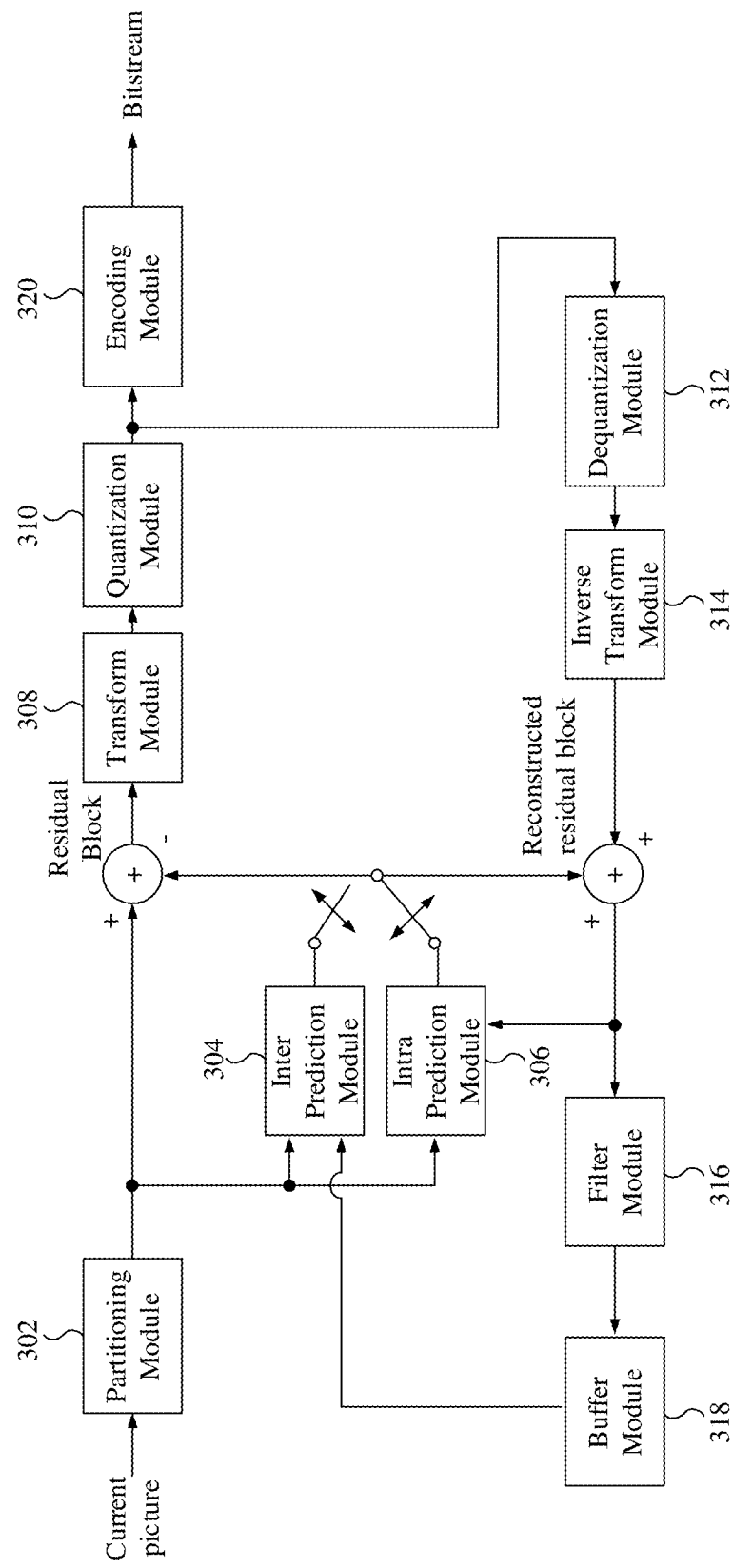
FIG. 3 illustrates a detailed block diagram of an exemplary encoder in the encoding system in FIG. 1, according to some embodiments of the present disclosure.

FIG. 3 illustrates a detailed block diagram of exemplary encoder 101 in encoding system 100 in FIG. 1, according to some embodiments of the present disclosure. As shown in FIG. 3, encoder 101 may include a partitioning module 302, an inter prediction module 304, an intra prediction module 306, a transform module 308, a quantization module 310, a dequantization module 312, an inverse transform module 314, a filter module 316, a buffer module 318, and an encoding module 320. It is understood that each of the elements shown in FIG. 3 is independently shown to represent characteristic functions different from each other in a video encoder, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on encoder 101.

Partitioning module 302 may be configured to partition an input picture of a video into at least one processing unit. A picture can be a frame of the video or a field of the video. In some embodiments, a picture includes an array of luma samples in monochrome format, or an array of luma samples and two corresponding arrays of chroma samples. At this point, the processing unit may be a prediction unit (PU), a transform unit (TU), or a coding unit (CU). Partitioning module 302 may partition a picture into a combination of a plurality of coding units, prediction units, and transform units, and encode a picture by selecting a combination of a coding unit, a prediction unit, and a transform unit based on a predetermined criterion (e.g., a cost function).

Figure 5:
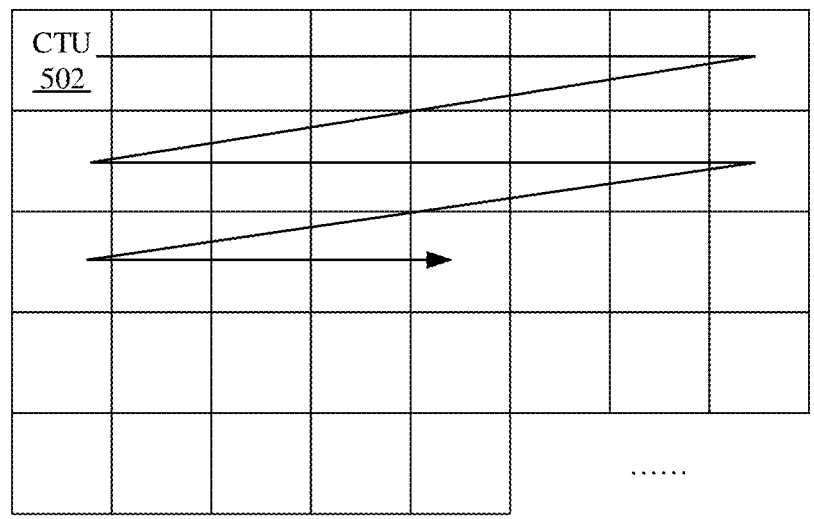
FIG. 5 illustrates an exemplary picture divided into coding tree units (CTUs), according to some embodiments of the present disclosure.
Figure 6:
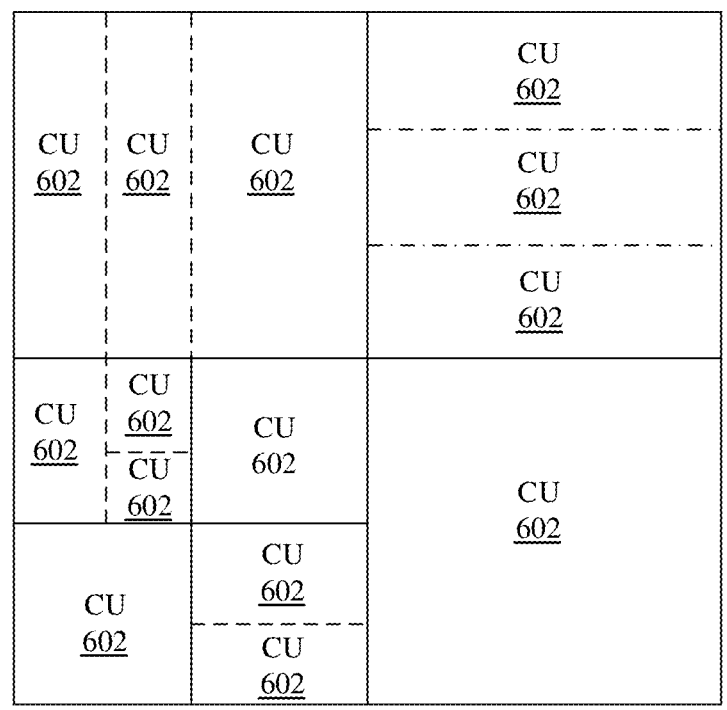
FIG. 6 illustrates an exemplary CTU divided into coding units (CUs), according to some embodiments of the present disclosure.

Similar to H.265/HEVC, H.266/VVC is a block-based hybrid spatial and temporal predictive coding scheme. As shown in FIG. 5, during encoding, an input picture 500 is first divided into square blocks—CTUs 502, by partitioning module 302. For example, CTUs 502 can be blocks of 128×128 pixels. As shown in FIG. 6, each CTU 502 in picture 500 can be partitioned by partitioning module 302 into one or more CUs 602, which can be used for prediction and transformation. Unlike H.265/HEVC, in H.266/VVC, CUs 602 can be rectangular or square, and can be coded without further partitioning into prediction units or transform units. For example, as shown in FIG. 6, the partition of CTU 502 into CUs 602 may include quadtree splitting (indicated in solid lines), binary tree splitting (indicated in dashed lines), and ternary splitting (indicated in dash-dotted lines). Each CU 602 can be as large as its root CTU 502 or be subdivisions of root CTU 502 as small as 4×4 blocks, according to some embodiments.

Referring to FIG. 3, inter prediction module 304 may be configured to perform inter prediction on a prediction unit, and intra prediction module 306 may be configured to perform intra prediction on the prediction unit. It may be determined whether to use inter prediction or to perform intra prediction for the prediction unit, and determine specific information (e.g., intra prediction mode, motion vector, reference picture, etc.) according to each prediction method. At this point, a processing unit for performing prediction may be different from a processing unit for determining a prediction method and specific content. For example, a prediction method and a prediction mode may be determined in a prediction unit, and prediction may be performed in a transform unit. Residual coefficients in a residual block between the generated prediction block and the original block may be input into transform module 308. In addition, prediction mode information, motion vector information, and the like used for prediction may be encoded by encoding module 320 together with the residual coefficients or quantization levels into the bitstream. It is understood that in certain encoding modes, an original block may be encoded as it is without generating a prediction block through prediction module 304 or 306. It is also understood that in certain encoding modes, prediction, transform, and/or quantization may be skipped as well.

In some embodiments, inter prediction module 304 may predict a prediction unit based on information on at least one picture among pictures before or after the current picture, and in some cases, it may predict a prediction unit based on information on a partial area that has been encoded in the current picture. Inter prediction module 304 may include sub-modules, such as a reference picture interpolation module, a motion prediction module, and a motion compensation module (not shown). For example, the reference picture interpolation module may receive reference picture information from buffer module 318 and generate pixel information of an integer number of pixels or less from the reference picture. In the case of a luminance pixel, a discrete cosine transform (DCT)-based 8-tap interpolation filter with a varying filter coefficient may be used to generate pixel information of an integer number of pixels or less by the unit of ¼ pixels. In the case of a color difference signal, a DCT-based 4-tap interpolation filter with a varying filter coefficient may be used to generate pixel information of an integer number of pixels or less by the unit of ⅛ pixels. The motion prediction module may perform motion prediction based on the reference picture interpolated by the reference picture interpolation part. Various methods such as a full search-based block matching algorithm (FBMA), a three-step search (TSS), and a new three-step search algorithm (NTS) may be used as a method of calculating a motion vector. The motion vector may have a motion vector value of a unit of ½, ¼, or 1/16 pixels or integer pel based on interpolated pixels. The motion prediction module may predict a current prediction unit by varying the motion prediction method. Various methods such as a skip method, a merge method, an advanced motion vector prediction (AMVP) method, an intra-block copy method, and the like may be used as the motion prediction method.

In some embodiments, intra prediction module 306 may generate a prediction unit based on the information on reference pixels around the current block, which is pixel information in the current picture. When a block in the neighborhood of the current prediction unit is a block on which inter prediction has been performed and thus, the reference pixel is a pixel on which inter prediction has been performed, the reference pixel included in the block on which inter prediction has been performed may be used in place of reference pixel information of a block in the neighborhood on which intra prediction has been performed. That is, when a reference pixel is unavailable, at least one reference pixel among available reference pixels may be used in place of unavailable reference pixel information. In the intra prediction, the prediction mode may have an angular prediction mode that uses reference pixel information according to a prediction direction, and a non-angular prediction mode that does not use directional information when performing prediction. A mode for predicting luminance information may be different from a mode for predicting color difference information, and intra prediction mode information used to predict luminance information or predicted luminance signal information may be used to predict the color difference information. If the size of the prediction unit is the same as the size of the transform unit when intra prediction is performed, the intra prediction may be performed for the prediction unit based on pixels on the left side, pixels on the top-left side, and pixels on the top of the prediction unit. However, if the size of the prediction unit is different from the size of the transform unit when the intra prediction is performed, the intra prediction may be performed using a reference pixel based on the transform unit.

The intra prediction method may generate a prediction block after applying an adaptive intra smoothing (AIS) filter to the reference pixel according to a prediction mode. The type of the AIS filter applied to the reference pixel may vary. In order to perform the intra prediction method, the intra prediction mode of the current prediction unit may be predicted from the intra prediction mode of the prediction unit existing in the neighborhood of the current prediction unit. When a prediction mode of the current prediction unit is predicted using the mode information predicted from the neighboring prediction unit, if the intra prediction modes of the current prediction unit is the same as the prediction unit in the neighborhood, information indicating that the prediction modes of the current prediction unit is the same as the prediction unit in the neighborhood may be transmitted using predetermined flag information, and if the prediction modes of the current prediction unit and the prediction unit in the neighborhood are different from each other, prediction mode information of the current block may be encoded by extra flags information.

As shown in FIG. 3, a residual block including a prediction unit that has performed prediction based on the prediction unit generated by prediction module 304 or 306 and residual coefficient information, which is a difference value of the prediction unit with the original block, may be generated. The generated residual block may be input into transform module 308.

Transform module 308 may be configured to transform the residual block including the original block and the residual coefficient information of the prediction unit generated through prediction modules 304 and 306 using a transform method, such as DCT, discrete sine transform (DST), Karhunen-Loeve transform (KLT), or transform skip. Whether to apply the DCT, the DST, or the KLT to transform the residual block may be determined based on intra prediction mode information of a prediction unit used to generate the residual block. Transform module 308 can transform the video signals in the residual block from the pixel domain to a transform domain (e.g., a frequency domain depending on the transform method). It is understood that in some examples, transform module 308 may be skipped, and the video signals may not be transformed to the transform domain.

Quantization module 310 may be configured to quantize the coefficient of each position in the coding block to generate quantization levels of the positions. The current block may be the residual block. That is, quantization module 310 can perform a quantization process on each residual block. The residual block may include N×M positions (samples) each associated with a transformed or non-transformed video signal/data, such as luma and/or chroma information, where N and M are positive integers. In the present disclosure, before quantization, the transformed or non-transformed video signal at a specific position is referred to herein as a "coefficient." After quantization, the quantized value of the coefficient is referred to herein as a "quantization level" or "level."

Quantization can be used to reduce the dynamic range of transformed or non-transformed video signals so that fewer bits will be used to represent video signals. Quantization typically involves division by a quantization step size and subsequent rounding, while dequantization (a.k.a., inverse quantization) involves multiplication by the quantization step size. Such a quantization process is referred to as scalar quantization. The quantization of all coefficients within a coding block can be done independently, and this kind of quantization method is used in some existing video compression standards, such as H.264/AVC and H.265/HEVC.

For an N×M coding block, a specific coding scan order may be used to convert the two-dimensional (2D) coefficients of a block into a one-dimensional (1D) order for coefficient quantization and coding. Typically, the coding scan starts from the left-top corner and stops at the right-bottom corner of a coding block or the last non-zero coefficient/level in a right-bottom direction. It is understood that the coding scan order may include any suitable order, such as a zig-zag scan order, a vertical (column) scan order, a horizontal (row) scan order, a diagonal scan order, or any combinations thereof. Quantization of a coefficient within a coding block may make use of the coding scan order information. For example, it may depend on the status of the previous quantization level along the coding scan order. In order to further improve the coding efficiency, more than one quantizer, e.g., two scalar quantizers, can be used by quantization module 310. Which quantizer will be used for quantizing the current coefficient may depend on the information preceding the current coefficient in coding scan order. Such a quantization process is referred to as dependent quantization.

Referring to FIG. 3, encoding module 320 may be configured to encode the quantization level of each position in the coding block into the bitstream. In some embodiments, encoding module 320 may perform entropy encoding on the coding block. Entropy encoding may use various binarization methods, such as exponential-Golomb coding, and the binarized bins can be further coded by, for example, context-adaptive variable length coding (CAVLC), CABAC, and the like. Besides the quantization levels, encoding module 320 may encode various other information, such as block type information of a coding unit, prediction mode information, partitioning unit information, prediction unit information, transmission unit information, motion vector information, reference frame information, block interpolation information, and filtering information input from, for example, prediction modules 304 and 306. In some embodiments, encoding module 320 may perform residual coding on a coding block to convert the quantization level into the bitstream. For example, after quantization, there may be N×M quantization levels for an N×M block. These N×M levels may be zero or non-zero values. The non-zero levels may be further binarized to binary bins if the levels are not binary, for example, using CABAC.

Non-binary syntax elements may be mapped to binary codewords. The bijective mapping between symbols and codewords, for which typically simple structured codes are used, is called binarization. The binary symbols, also called bins, of both binary syntax elements and codewords for non-binary data may be coded using binary arithmetic coding. The core coding engine of CABAC can support two operating modes: a context coding mode, in which the bins are coded with adaptive probability models, and a less complex bypass mode that uses fixed probabilities of 1/2. The adaptive probability models are also called contexts, and the assignment of probability models to individual bins is referred to as context modeling.

Figure 7A:
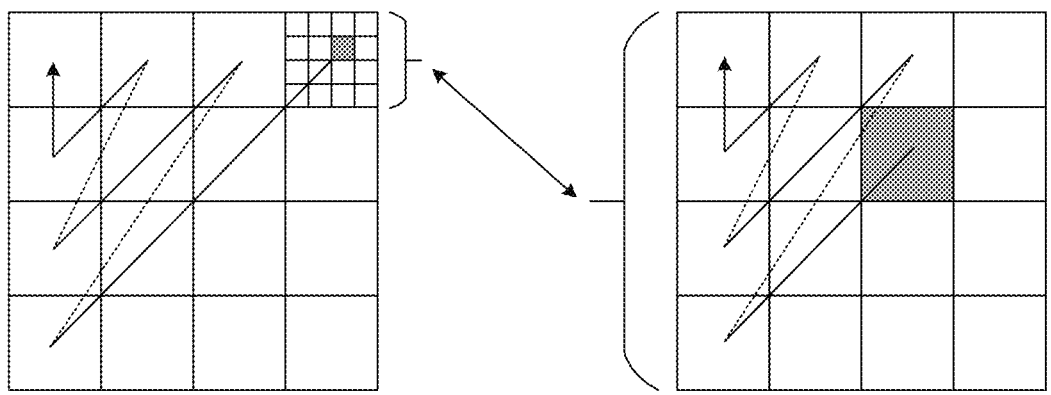
FIG. 7A illustrates an exemplary transform block encoded using regular residual coding (RRC), according to some embodiments of the present disclosure.

According to some aspects of the present disclosure, in H.266/VVC, the coding block is a transform block encoded using RRC. Transform blocks larger than 4×4 may be divided into disjunct 4×4 subblocks, which are processed using a reverse diagonal scan pattern. It is understood that H.266/VVC supports non-4×4 subblocks due to the support of non-square rectangular shape of transform blocks. For ease of description and without loss of generality, FIG. 7A depicts an example of 16×16 transform block, where this transform block is further partitioned into 4×4 subblocks. The reverse diagonal scan pattern is used for processing the subblocks of a transform block as well as for processing the frequency positions within each subblock.

In RRC, the position of the last non-zero level (a.k.a., the last significant scan position) may be defined as the position of the last non-zero level along the coding scan order. The 2D coordinates (last_sig_coeff_x and last_sig_coeff_y) of the last non-zero level may be first coded with up to four syntax elements, i.e., using up to four residual coding bins: two context-coded bins–two last significant coefficient prefixes (last_sig_coeff_x_prefix and last_sig_coeff_y_prefix), and two bypass-coded bins–two last significant coefficient suffixes (last_sig_coeff_x_suffix and last_sig_coeff_x_suffix). Within a subblock, RRC may first code a context-coded bin–a coded subblock flag (sb_coded_flag) to indicate whether the current subblock has all the levels equal to zero or not. For example, if sb_coded_flag is equal to 1, there may be at least one non-zero coefficient in the current subblock; if sb_coded_flag is equal to 0, all coefficients in the current subblock will be zeros. It is understood that the sb_coded_flag for the last non-zero subblock, which has the last non-zero level may be derived from last_sig_coeff_x and last_sig_coeff_y according to the coding scan order without coding into the bitstream. Other sb_coded_flag may be coded as context-coded bins. RRC may code subblock by subblock starting from the last non-zero subblock with a reverse coding scan order.

In order to guarantee the worst-case throughput, a value of remaining context-coded bins (remBinsPass1) may be used to limit the maximum number of context-coded bins. The initial value of remBinsPass1 may be calculated based, at least in part, on the length and width of the coding block. Within a subblock, RRC may code the level of each position with a reverse coding scan order. A predefined threshold may be compared with remBinsPass1 to determine whether the maximum number of context-coded bins has been reached. For example, the threshold of remBinsPass1 in H.266/VVC may be predefined to be 4.

Figure 8A:
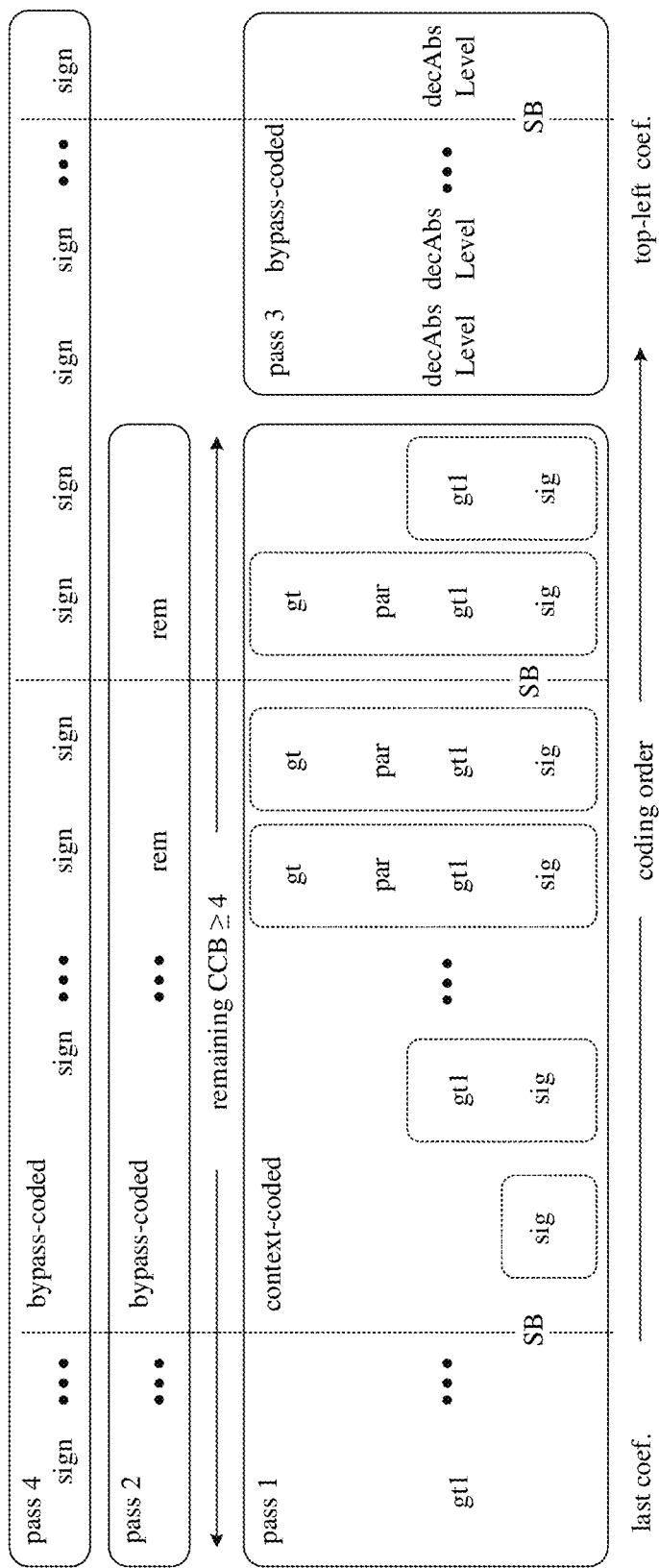
FIGS. 8A and 8B illustrate coding passes in RRC and TSRC, respectively.

As shown in FIG. 8A, if remBinsPass1 is not smaller than 4 ("remaining CCB>4" in FIG. 8A), when encoding the quantization level of each position of a subblock ("SB" in FIG. 8A), a significance flag (sig_coeff_flag, "sig" in FIG. 8A) may be first coded into the bitstream to indicate if the level is zero or non-zero. If the level is non-zero, a greater than 1 flag (abs_level_gtx_flag[n][0] where n is the index along scan order of current position within the subblock, "gt1" in FIG. 8A) may then be coded into the bitstream to indicate if the absolute level is 1 or greater than 1. If the absolute level is greater than 1, a parity flag (par_level_flag, "par" in FIG. 8A) may then be coded into the bitstream to indicate if the level is an odd or even number, and then a greater than flag (abs_level_gtx_flag[n][1], "gt" in FIG. 8A) may be present. The flags of par_level_flag and abs_level_gtx_flag[n][1] may also be used together to indicate the level is 2, 3, or greater than 3. After coding each above syntax element with the context coding method, i.e., context-coded bins, the value of remBinsPass1 may be decreased by 1. In other words, the significance flag, greater than 1 flag, parity flag, and greater than flag may be coded as context-coded bins for each position of each subblock in the first coding pass ("pass 1" in FIG. 8A).

If the absolute level is greater than 5 or the value of remBinsPass1 is smaller than 4, two more syntax elements, a reminder (abs_remainder, "rem" in FIG. 8A), and an absolute level (dec_abs_level, "decAbsLevel" in FIG. 8A) may be coded as bypass-coded bins in the second coding pass ("pass 2" in FIG. 8A) and the third coding pass ("pass 3" in FIG. 8A), respectively, for the remaining level after coding the aforementioned context-coded bins. In addition, a coefficient sign flag of each non-zero level (coeff_sign_flag, "sign" in FIG. 8A) may also be coded in the fourth coding pass ("pass 4" in FIG. 8A) as a bypass-coded bin to fully represent the quantization level.

In some embodiments, a more general residual coding method uses level greater than flags (abs_level_gtxX_flag)

and a remaining level bin to allow conditionally parsing the syntax elements for level coding of a transform block, and its corresponding binarization of absolute value of level is shown in TABLE I below. Here abs_level_gtxX_flag describes if the absolute value of level is greater than X, where X is an integer number, e.g., 0, 1, 2, . . . or N. If abs_level_gtxX_flag is 0, where X is an integer between 0 and N−1, abs_level_gtx(X+1)_flag will not be present. If abs_level_gtxX_flag is 1, abs_level_gtx(X+1)_flag will be present. Moreover, if abs_level_gtxN_flag is 0, the remainder will not be present. When abs_level_gtxN_flag is 1, the remainder will be present, and it represents the value after removing (N+1) from the level. Typically, abs_level_gtxX_flag may be coded as context-coded bins, and the remaining level bin is coded as a bypass-coded bin.

TABLE I

Residual Coding Based On abs_level_gtxX_flag Bins and Remainder Bin

| abs(lvl) | 0 | 1 | 2 | 3 | 4 | 5 | 6 | 7 | 8 | 9 | ... |
|---|---|---|---|---|---|---|---|---|---|---|---|
| abs_level_gtx0_flag | 0 | 1 | 1 | 1 | 1 | 1 | 1 | 1 | 1 | 1 | ... |
| abs_level_gtx1_flag |   | 0 | 1 | 1 | 1 | 1 | 1 | 1 | 1 | 1 | ... |
| abs_level_gtx2_flag |   |   | 0 | 1 | 1 | 1 | 1 | 1 | 1 | 1 | ... |
| abs_level_gtx3_flag |   |   |   | 0 | 1 | 1 | 1 | 1 | 1 | 1 | ... |
| abs_remainder |   |   |   |   | 0 | 1 | 2 | 3 | 4 | 5 | ... |

Figure 7B:
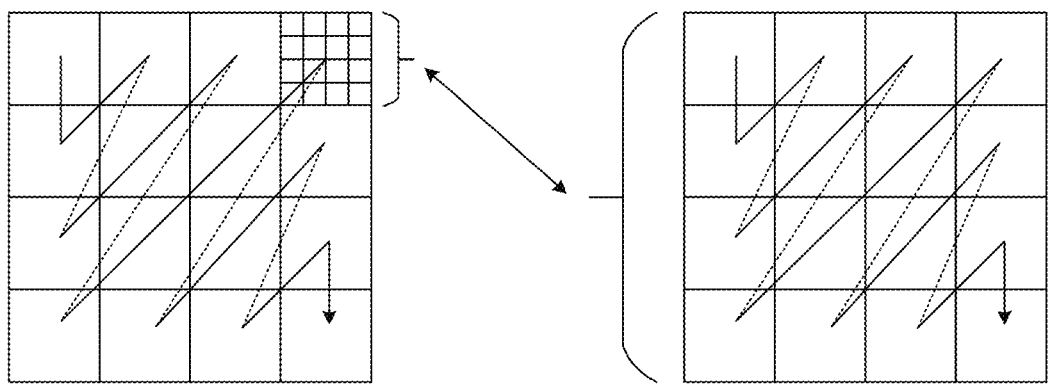
FIG. 7B illustrates an exemplary transform skip block encoded using transform skip residual coding (TSRC), according to some embodiments of the present disclosure.

According to some aspects of the present disclosure, in H.266/VVC, the coding block is a transform skip block encoded using TSRC. Transform skip blocks larger than 4×4 may be divided into disjunct 4×4 subblocks, which are processed using a reverse diagonal scan pattern. It is understood that H.266/VVC supports non-4×4 subblocks due to the support of non-square rectangular shape of transform blocks. For ease of description and without loss of generality, FIG. 7B depicts an example of 16×16 transform skip blocks, where this transform skip block is partitioned into 4×4 subblocks. One difference between TSRC and RRC is a reversion of the scan order. As shown in FIG. 7B, the diagonal scan may be used in a forward manner (and not in reverse order as in the RRC).

Moreover, different from RRC in which the last significant scan position is coded into the bitstream, in TSRC, the last significant scan position may not be coded, and all scan positions of a transform skip block may be coded. Similar to RRC, in TSRC, the coded subblock flag (sb_coded_flag) may be used to indicate if the current subblock has all the quantization levels equal to zero or not. Also, in order to guarantee the worst-case throughput, a value of remaining context-coded bins (RemCcbs) is used to limit the maximum number of context-coded bins. A predefined threshold may be compared with RemCcbs to determine whether the maximum number of context-coded bins has been reached. For example, the threshold of RemCcbs in H.266/VVC may be predefined to be 4.

Figure 8B:
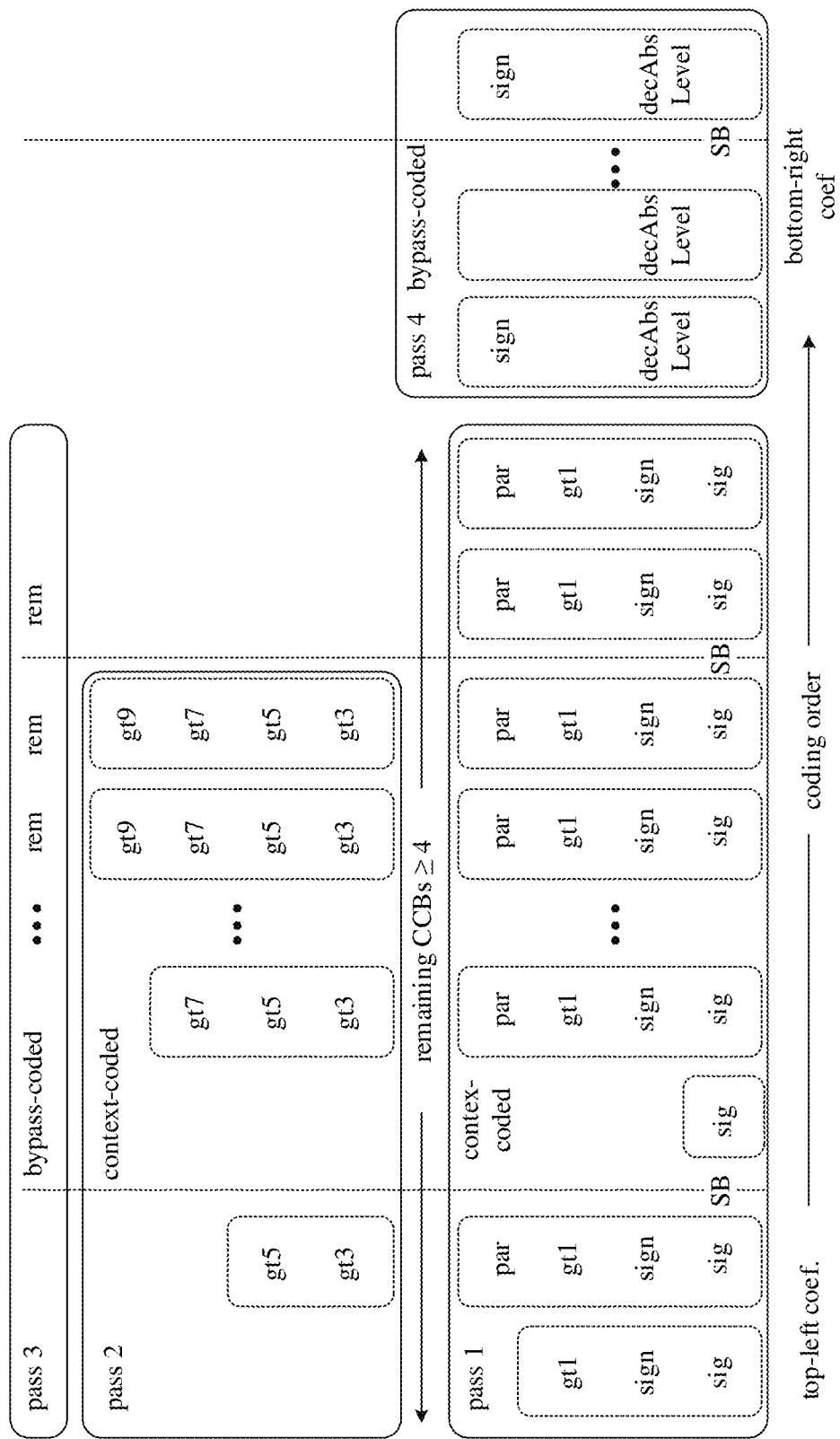

As shown in FIG. 8B, if RemCcbs is not smaller than 4 ("remaining CCB>4" in FIG. 8B), for each level in each subblock, a significance flag (sig_coeff_flag, "sig" in FIG. 8B) may first be coded into the bitstream to indicate if the level is zero or non-zero. If the level is non-zero, a coefficient sign flag (coeff_sign_flag, "sign" in FIG. 8B) may be coded to indicate whether the level is positive or negative. Then a greater than 1 flag (abs_level_gtx_flag[n][0] where n is the index along scan order of current position within the subblock, "gt1" in FIG. 8B) may be coded to indicate if the current absolute level of the current position is greater than 1 or not. If abs_level_gtx_flag[n][0] is not zero, a parity flag (par_level_flag, "par" in FIG. 8B) may be coded. After coding each above syntax element with the context coding method, i.e., context-coded bins, the value of RemCcbs may be decreased by 1. In other words, the significance flag, coefficient sign flag, greater than 1 flag, and parity flag may be coded as context-coded bins for each position of each subblock in the first coding pass ("pass 1" in FIG. 8B).

After coding the above syntax elements for all positions within the current subblock, if the RemCcbs is still not smaller than 4, up to 4 more greater than flags (abs_level_gtx_flag[n][j], where n is the index along scan order of current position within a subblock and j is from 1 to 4, "gt3, gt5, gt7, and gt9" in FIG. 8B) may be coded as context-coded bins in the second coding pass ("pass 2" in FIG. 8B). The value of RemCcbs may be decreased by 1 after each abs_level_gtx_flag[n][j] is coded in the second coding pass. If RemCcbs is not smaller than 4, reminder (abs_remainder, "rem" in FIG. 8B) may be coded as a bypass-coded bin, if necessary, for the current position within a subblock, in the third coding pass ("pass 3" in FIG. 8B). For those positions where the absolute levels (dec_abs_level, "decAbsLevel" in FIG. 8B) are fully coded as bypass-coded bins, the coeff_sign_flags may also be coded as bypass-coded bins in the fourth coding pass ("pass 4" in FIG. 8B).

Referring back to FIG. 3, as shown in FIG. 3 dequantization module 312 may be configured to dequantize the quantization levels by dequantization module 312, and inverse transform module 314 may be configured to inversely transform the coefficients transformed by transform module 308. The reconstructed residual block generated by dequantization module 312 and inverse transform module 314 may be combined with the prediction units predicted through prediction module 304 or 306 to generate a reconstructed block.

Filter module 316 may include at least one among a deblocking filter, an offset correction module, and an adaptive loop filter (ALF). The deblocking filter may remove block distortion generated by the boundary between blocks in the reconstructed picture. The offset correction module may correct an offset to the original video by the unit of pixel for a video on which the deblocking has been performed. ALF may be performed based on a value obtained by comparing the reconstructed and filtered video and the original video. Buffer module 318 may be configured to store the reconstructed block or picture calculated through filter module 316, and the reconstructed and stored block or picture may be provided to inter prediction module 304 when inter prediction is performed.

Figure 4:
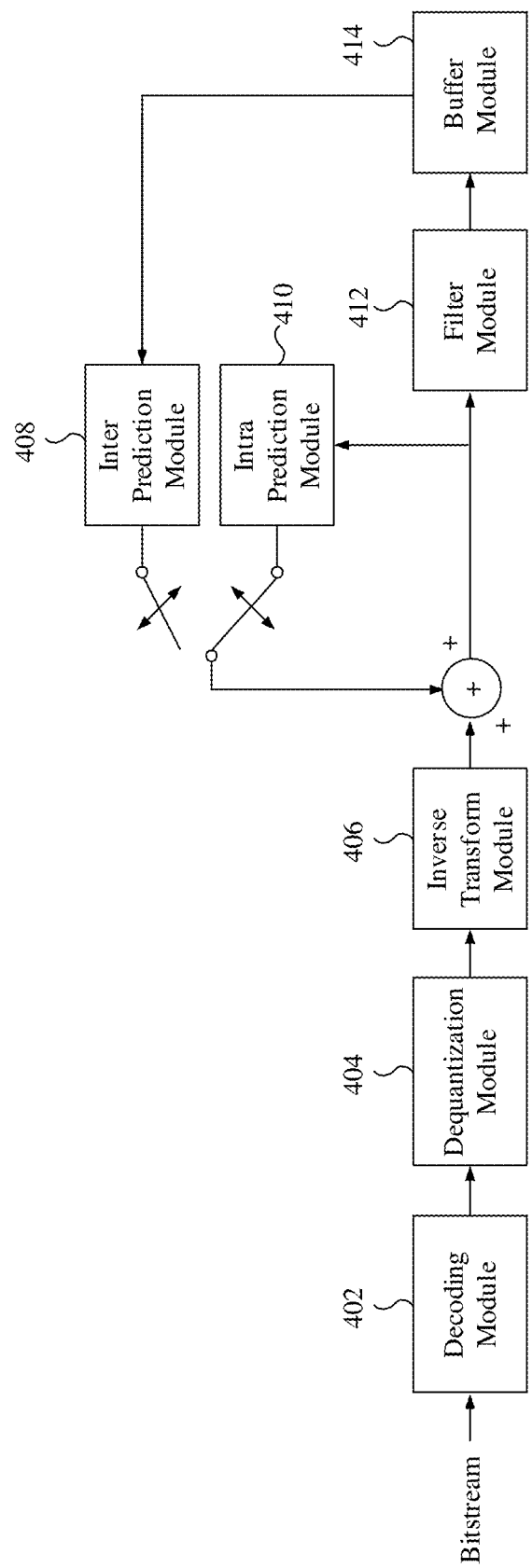
FIG. 4 illustrates a detailed block diagram of an exemplary decoder in the decoding system in FIG. 2, according to some embodiments of the present disclosure.

FIG. 4 illustrates a detailed block diagram of exemplary decoder 201 in decoding system 200 in FIG. 2, according to some embodiments of the present disclosure. As shown in FIG. 4, decoder 201 may include a decoding module 402, a dequantization module 404, an inverse transform module 406, an inter prediction module 408, an intra prediction module 410, a filter module 412, and a buffer module 414.

It is understood that each of the elements shown in FIG. 4 is independently shown to represent characteristic functions different from each other in a video decoder, and it does not mean that each component is formed by the configuration unit of separate hardware or single software. That is, each element is included to be listed as an element for convenience of explanation, and at least two of the elements may be combined to form a single element, or one element may be divided into a plurality of elements to perform a function. It is also understood that some of the elements are not necessary elements that perform functions described in the present disclosure but instead may be optional elements for improving performance. It is further understood that these elements may be implemented using electronic hardware, firmware, computer software, or any combination thereof. Whether such elements are implemented as hardware, firmware, or software depends upon the particular application and design constraints imposed on decoder 201.

When a video bitstream is inputted from a video encoder (e.g., encoder 101), the input bitstream may be decoded by decoder 201 in a procedure opposite to that of the video encoder. Thus, some details of decoding that are described above with respect to encoding may be skipped for ease of description. Decoding module 402 may be configured to decode the bitstream to obtain various information encoded into the bitstream, such as the quantization level of each position in the coding block. In some embodiments, decoding module 402 may perform entropy decoding corresponding to the entropy encoding performed by the encoder, such as exponential-Golomb coding or context coding, for example, CAVLC, CABAC, and the like. Besides the quantization levels of the positions in the coding block, decoding module 402 may decode various other information, such as block type information of a coding unit, prediction mode information, partitioning unit information, prediction unit information, transmission unit information, motion vector information, reference frame information, block interpolation information, and filtering information. During the decoding process, decoding module 402 may perform rearrangement on the bitstream to reconstruct and rearrange the data from a 1D order into a 2D rearranged block through a method of inverse-scanning based on the coding scan order used by the encoder.

Dequantization module 404 may be configured to dequantize the quantization level of each position of the coding block (e.g., the 2D reconstructed block) to obtain the coefficient of each position. In some embodiments, dequantization module 404 may perform dependent dequantization based on quantization parameters provided by the encoder as well, including the information related to the quantizers used in dependent quantization, for example, the quantization step size used by each quantizer.

Inverse transform module 406 may be configured to perform inverse transformation, for example, inverse DCT, inverse DST, and inverse KLT, for DCT, DST, and KLT performed by the encoder, respectively, to transform the data from the transform domain (e.g., coefficients) back to the pixel domain (e.g., luma and/or chroma information). In some embodiments, inverse transform module 406 may selectively perform a transform operation (e.g., DCT, DST, KLT) according to a plurality of pieces of information such as a prediction method, a size of the current block, a prediction direction, and the like.

Inter prediction module 408 and intra prediction module 410 may be configured to generate a prediction block based on information related to the generation of a prediction block provided by decoding module 402 and information of a previously decoded block or picture provided by buffer module 414. As described above, if the size of the prediction unit and the size of the transform unit are the same when intra prediction is performed in the same manner as the operation of the encoder, intra prediction may be performed on the prediction unit based on the pixel existing on the left side, the pixel on the top-left side, and the pixel on the top of the prediction unit. However, if the size of the prediction unit and the size of the transform unit are different when intra prediction is performed, intra prediction may be performed using a reference pixel based on a transform unit.

The reconstructed block or reconstructed picture combined from the outputs of inverse transform module 406 and prediction module 408 or 410 may be provided to filter module 412. Filter module 412 may include a deblocking filter, an offset correction module, and an ALF. Buffer module 414 may store the reconstructed picture or block and use it as a reference picture or a reference block for inter prediction module 408 and may output the reconstructed picture.

The encoding/decoding operations performed by encoding module 320 and decoding module 402, as described above, however, may not be suitable for some video coding applications, such as high bit-depth and high bit-rate video coding, due to its limited throughput. Although there are counters remBinsPass1 and RemCcbs in RRC and TSRC, respectively, to limit the total number of context-coded bins to help the worst-case throughput, the higher computational expense of processing context-coded bins and the undesired switch between context-coded bins and bypass-coded bins in CABAC limit the throughput of video coding.

Consistent with the scope of the present disclosure, encoding module 320 and decoding module 402 may be configured to enable a high throughput mode in which at least one residual coding bin of the coding block is changed from a context-coded bin to a bypass-coded bin. As such, encoding module 320 may be configured to encode the quantization levels of the coding block, and/or any other suitable information related to the coding block, into the bitstream in the high throughput mode to improve the throughput. Similarly, decoding module 402 may be configured to decode the bitstream to obtain the quantization levels of the coding block, and/or any other suitable information related to the coding block, in the high throughput mode to improve the throughput.

Consistent with the scope of the present disclosure, the high throughput mode may be enabled by encoding module 320 and decoding module 402 not only at the coding block level, but also at the transform unit level. In some embodiments, in the high throughput mode, a plurality of transform unit bins of the transform unit is changed from context-coded bins to bypass-coded bins. As such, encoding module 320 may be configured to encode the quantization levels of the transform unit, and/or any other suitable information related to the transform unit, into the bitstream in the high throughput mode to improve the throughput. Similarly, decoding module 402 may be configured to decode the bitstream to obtain the quantization levels of the transform unit, and/or any other suitable information related to the transform unit, in the high throughput mode to improve the throughput. Any other suitable bypass-coded bins, such as motion vector difference bins, may be changed to bypass-coded bins when the high throughput mode is enabled when encoding module 320 performs the encoding operations and when decoding module 402 performs the decoding operations.

CABAC in H.266/VVC is a sequential process where the evaluation of each iteration depends on the outcome of the previous iteration. At the higher bit-depth and higher bit-rate operating ranges (especially in 16-bit input), the serial nature of CABAC decoding process may impact the throughput of the codec. Consistent with the scope of the present disclosure, a bypass alignment method for VVC operation range extension may be used before starting the encoding/decoding of bypass-coded bins, for example, by setting the value of the current interval length R (e.g., a 9-bit variable known as ivlCurrRange) of CABAC engine to be 256. After aligning the ivlCurrRange, e.g., to be 256, the decoding process of bypass-coded bins can be implemented using a shift operation, e.g., by a shift register, instead of going through regular CABC operations. Therefore, multiple bypass-coded bins after alignment can be coded simultaneously to further improve the throughput.

In order to take advantage of both bypass alignment and full-bypass coding schemes, consistent with the scope of the present disclosure, bypass bit-alignment is applied in the high throughput mode as well. The application of the bypass bit-alignment can be invoked, for example, by setting the value of the current interval length to be 256, at different stages of the encoding and decoding processes as described below in detail.

Figure 9A:
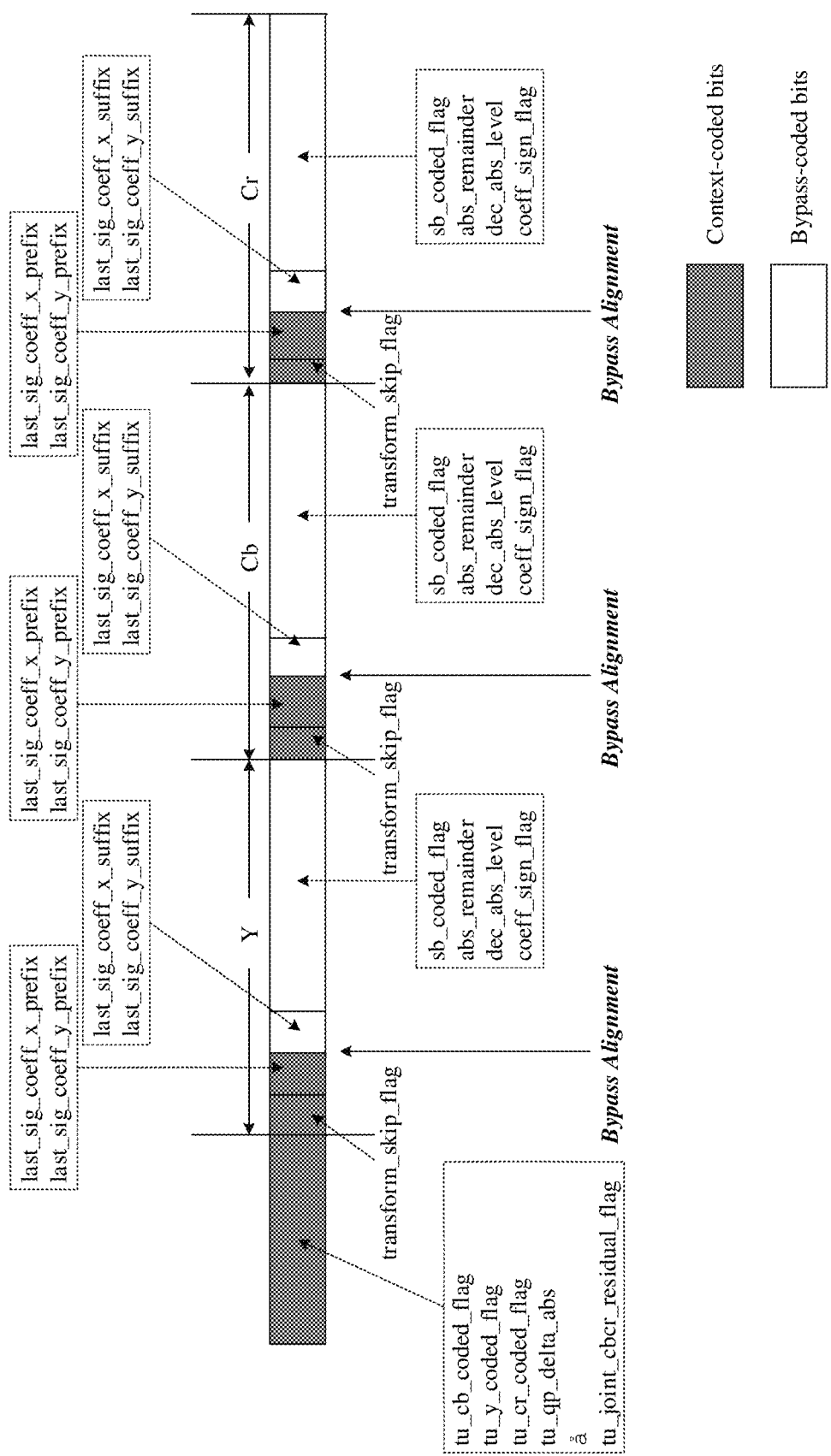
FIG. 9A illustrates an exemplary bypass alignment scheme in RRC, according to some embodiments of the present disclosure.

FIG. 9A illustrates an exemplary bypass alignment scheme in RRC, according to some embodiments of the present disclosure. As shown in FIG. 9A, the bitstream may start from transform unit bins of a transform unit. Various transform unit bins may remain as context-coded bins for context coding in CABAC. The transform unit bins may include a coded Cb transform block flag (tu_cb_coded_flag), a coded Cr transform block flag (tu_cr_coded_flag), a coded luma transform block flag (tu_y_coded_flag), a quantization parameter delta value (cu_qp_delta_abs), a chroma quantization parameter offset flag (cu_chroma_qp_offset_flag), a chroma quantization parameter offset index (cu_chroma_qp_offset_idx), a joint chroma flag (tu_joint_cbcr_residual_flag), and transform skip flags (transform_skip_flag). It is understood that transform unit bins may also include a bypass-coded bin, such as a quantization parameter delta sign flag (cu_qp_delta_sign_flag) in some examples.

As shown in FIG. 9A, the transform unit may correspond to one coding block (e.g., transform block for RRC) of luma samples ("Y" in FIG. 9A) and two corresponding coding blocks of chroma samples ("Cb" and "Cr" in FIG. 9A). Transform unit bins thus may include three transform_skip_flags for Y, Cb, and Cr coding blocks, respectively, each of which is a context-coded bin. For each coding block, the first residual coding bin of the coding block that is to be encoded/decoded in the bitstream after transform_skip_flag may be the last significant coefficient prefixes (last_sig_coeff_x_prefix and last_sig_coeff_y_prefix), which remain as context-coded bins. All other residual coding bins in each coding block may be bypass-coded bins, as shown in FIG. 9A. For example, the bypass-coded residual coding bins may include the last significant coefficient suffixes (last_sig_coeff_x_suffix and last_sig_coeff_y_suffix), the coded subblock flag (sb_coded_flag), the reminder (abs_remainder), the absolute level (dec_abs_level), and the coefficient sign flag (coeff_sign_flag).

That is, the high throughput mode may be enabled for each coding block after last_sig_coeff_x_prefix and last_sig_coeff_y_prefix and before sb_coded_flag. In some embodiments in which last_sig_coeff_x_sufix and last_sig_coeff_y_sufix also need to be coded, the high throughput mode may be enabled for each coding block after last_sig_coeff_x_prefix and last_sig_coeff_y_prefix and before last_sig_coeff_x_sufix and last_sig_coeff_y_sufix. In other words, the high throughput mode may be enabled for each coding block right after last_sig_coeff_x_prefix and last_sig_coeff_y_prefix. The residual coding bin–sb_coded_flag may be changed from a context-coded bin to a bypass-coded bin for each position of each subblock in the high throughput mode. The coding of all other context-coded bins, such as the significance flag (sig_coeff_flag), greater than 1 flag (abs_level_gtx_flag[n][0]), parity flag (par_level_flag), and greater than flag (abs_level_gtx_flag[n][1]), may be skipped, for example, by setting the value of remaining context-coded bins (remBinsPass1) to be less than the threshold 4, e.g., to be 0. In other words, in the high throughput mode, the first coding pass of each position of each subblock of a coding block may be skipped, such that the context-coded bins may not occur in the first coding pass. As a result, each coding block may be coded using only bypass-coded bins except for last_sig_coeff_x_prefix and last_sig_coeff_y_prefix in the high throughput mode.

As shown in FIG. 9A, for each coding block, application of the bypass bit-alignment may be invoked right after last_sig_coeff_x_prefix and last_sig_coeff_y_prefix, for example, by setting the value of ivlCurrRange to be 256, as part of the high throughput mode, such that all bypass-coded bins may be bit-aligned to allow shift operation and parallel processing. As shown in FIG. 9A, the high throughput mode may be enabled at the coding block level, and the bypass bit-alignment may be invoked 3 times for three coding blocks corresponding to a transform unit.

Figure 9B:
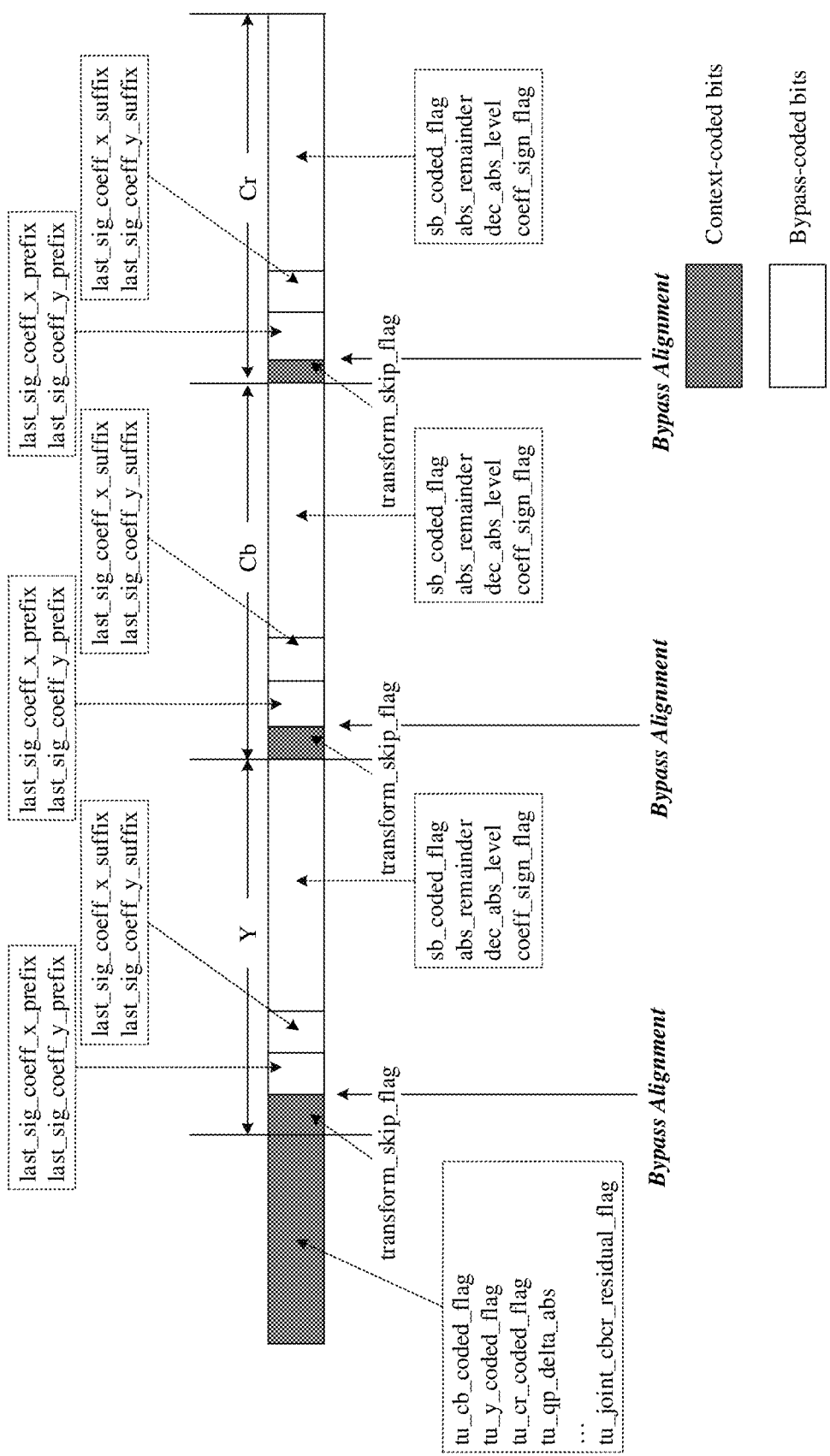
FIG. 9B illustrates another exemplary bypass alignment scheme in RRC, according to some embodiments of the present disclosure.

FIG. 9B illustrates another exemplary bypass alignment scheme in RRC, according to some embodiments of the present disclosure. Different from the bypass alignment scheme in FIG. 9A, in the bypass alignment scheme of FIG. 9B further changes last_sig_coeff_x_prefix and last_sig_coeff_y_prefix from context-coded bins to bypass-coded bins in the high throughput mode, such that each coding block may be coded using only bypass-coded bins in the high throughput mode in FIG. 9B. Also, as shown in FIG. 9B, for each coding block, application of the bypass bit-alignment may be invoked before last_sig_coeff_x_prefix and last_sig_coeff_y_prefix, for example, by setting the value of ivlCurrRange to be 256, as part of the high throughput mode, such that all bypass-coded bins may be bit-aligned to allow shift operation and parallel processing. For example, the bypass bit-alignment may be applied at the beginning of the bitstream of each coding block. As shown in FIG. 9B, the high throughput mode may be enabled at the coding block level, and the bypass bit-alignment may be invoked 3 times for three coding blocks corresponding to a transform unit.

Compared with the scheme in FIG. 9A, the scheme in FIG. 9B can further improve the throughput of video coding by changing the last significant coefficients prefixes from context-coded bins to bypass-code bins. For very high bit-rate and high bit-depth operating range, the bits for the position of the last significant coefficients may also be quite high because most of the blocks are coded as smaller block sizes. The derivation of the context indices of last_sig_coeff_x_prefix and last_sig_coeff_y_prefix may impact the throughput because index of the context variables is derived for each bin of last_sig_coeff_x_prefix and last_sig_coeff_y_prefix.

Figure 9C:
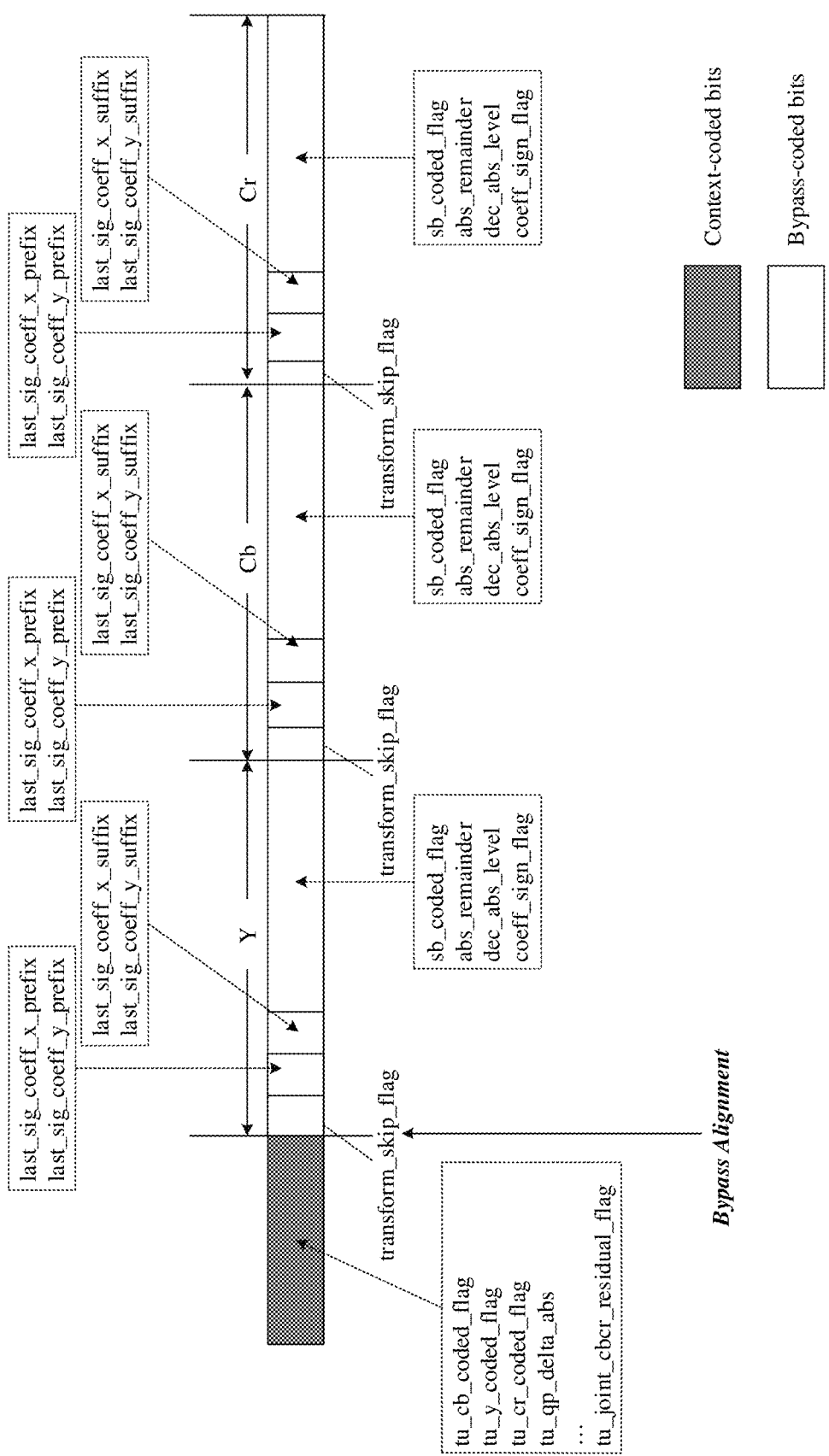
FIG. 9C illustrates still another exemplary bypass alignment scheme in RRC, according to some embodiments of the present disclosure.

FIG. 9C illustrates still another exemplary bypass alignment scheme in RRC, according to some embodiments of the present disclosure. Different from the bypass alignment scheme in FIG. 9B, in the bypass alignment scheme of FIG. 9C further changes transform_skip_flag from context-coded bin to bypass-coded bin in the high throughput mode, such that for each transform unit, application of the bypass bit-alignment may be invoked before the first transform_skip_flag, for example, by setting the value of ivlCurrRange to be 256, as part of the high throughput mode, such that the bypass bit-alignment may only be invoked once for all three coding blocks corresponding to the transform unit.

Compared with the scheme in FIG. 9B, the scheme in FIG. 9C can further improve the throughput of video coding by invoking the bypass bit-alignment only once for each transform units, as opposed to 3 times for the 3 coding blocks separately.

Figure 9D:
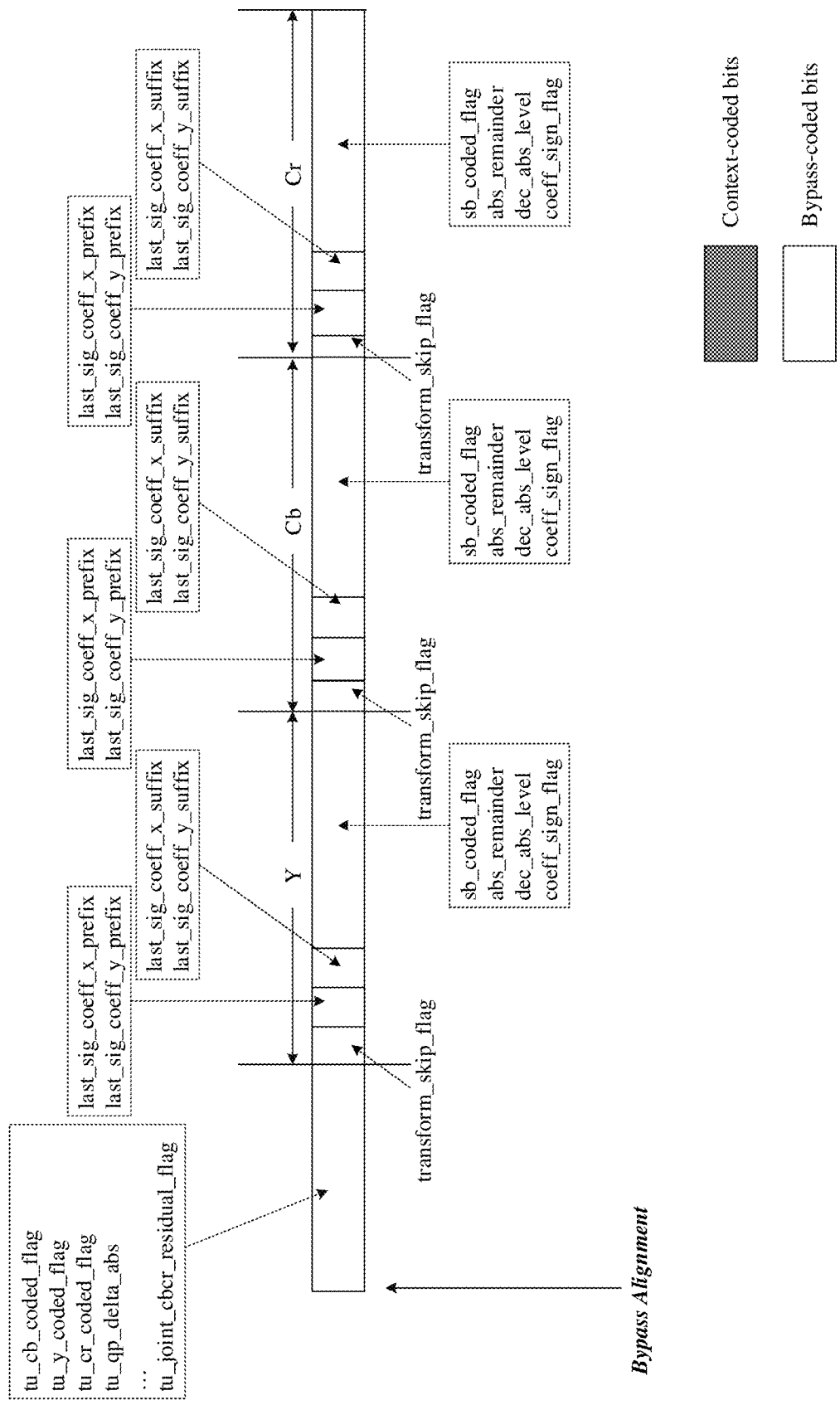
FIG. 9D illustrates an exemplary bypass alignment scheme in transform unit (TU) coding and RRC, according to some embodiments of the present disclosure.

FIG. 9D illustrates still another exemplary bypass alignment scheme in RRC, according to some embodiments of the present disclosure. Different from the bypass alignment scheme in FIG. 9C, in the bypass alignment scheme of FIG. 9D further changes transform unit bins of the transform unit from context-coded bins to bypass-code bins, such that all the transform unit bins of the transform unit are coded as bypass-code bins as well in the high throughput mode. For example, in the high throughput mode, besides transform_skip_flags, tu_cb_coded_flag, tu_cr_coded_flag, tu_y_coded_flag, cu_qp_delta_abs, cu_chroma_qp_offset_flag, cu_chroma_qp_offset_idx, and tu_joint_cbcr_residual_flag may be changed from context-coded bins to bypass-coded bins. As a result, the transform unit and three corresponding coding blocks may be coded using only bypass-coded bins in the high throughput mode in FIG. 9D.

As shown in FIG. 9D, for each transform unit, application of the bypass bit-alignment may be invoked before the first one of the transform unit bins, such as tu_cb_coded_flag, for example, by setting the value of ivlCurrRange to be 256, as part of the high throughput mode, such that the bypass bit-alignment may only be invoked once for each transform unit. For example, the bypass bit-alignment may be applied at the beginning of the bitstream of the transform unit.

Compared with the scheme in FIG. 9C, the scheme in FIG. 9D can further improve the throughput of video coding by coding the transform unit bins as only bypass-coded bins to avoid any switch between context coding and bypass coding by the CABAC coding engine when coding the transform unit. The high throughput mode may be enabled at the transform unit level.

Figure 10A:
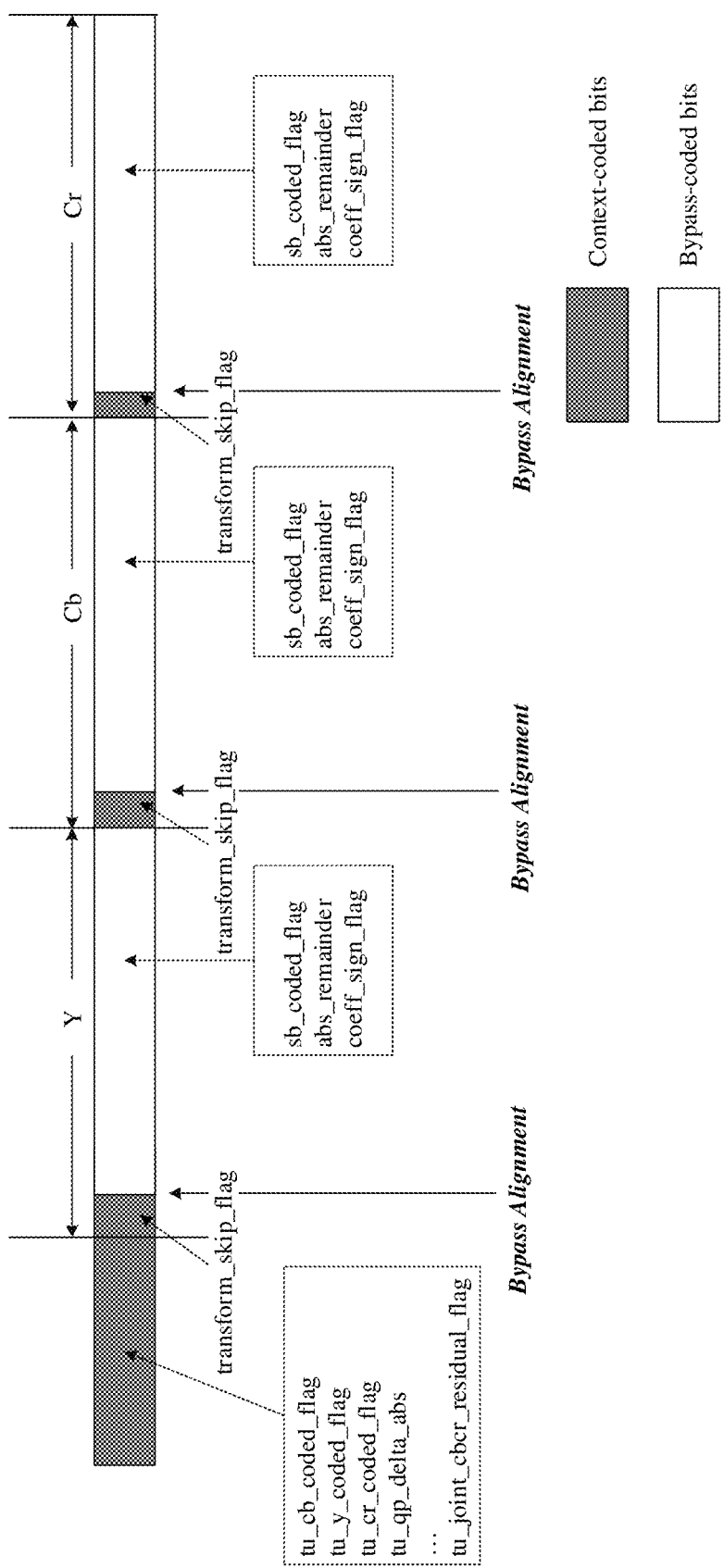
FIG. 10A illustrates an exemplary bypass alignment scheme in TSRC, according to some embodiments of the present disclosure.

FIG. 10A illustrates an exemplary bypass alignment scheme in TSRC, according to some embodiments of the present disclosure. As shown in FIG. 10A, the bitstream may start from transform unit bins of a transform unit. Various transform unit bins may remain as context-coded bins for context coding in CABAC. The transform unit bins may include a coded Cb transform block flag (tu_cb_coded_flag), a coded Cr transform block flag (tu_cr_coded_flag), a coded luma transform block flag (tu_y_coded_flag), a quantization parameter delta value (cu_qp_delta_abs), a chroma quantization parameter offset flag (cu_chroma_qp_offset_flag), a chroma quantization parameter offset index (cu_chroma_qp_offset_idx), a joint chroma flag (tu_joint_cbcr_residual_flag), and transform skip flags (transform_skip_flag). It is understood that transform unit bins may also include a bypass-coded bin, such as a quantization parameter delta sign flag (cu_qp_delta_sign_flag) in some examples.

As shown in FIG. 10A, the transform unit may correspond to one coding block (e.g., transform skip block for TSRC) of luma samples ("Y" in FIG. 10A) and two corresponding coding blocks of chroma samples ("Cb" and "Cr" in FIG. 10A). Transform unit bins thus may include three transform_skip_flags for Y, Cb, and Cr coding blocks, respectively, each of which is a context-coded bin. For each coding block, all residual coding bins in each coding block may be bypass-coded bins as shown in FIG. 10A. For example, the bypass-coded residual coding bins may include the coded subblock flag (sb_coded_flag), the reminder (abs_remainder), and the coefficient sign flag (coeff_sign_flag).

That is, the high throughput mode may be enabled before sb_coded_flag. A residual coding bin, sb_coded_flag may be changed from a context-coded bin to a bypass-coded bin for each position of each subblock in the high throughput mode. The coding of all other context-coded bins, such as the significance flag (sig_coeff_flag), greater than flags (abs_level_gtx_flag[n][j]), and parity flag (par_level_flag), may be skipped, for example, by setting the value of remaining context-coded bins (RemCcbs) to be less than the threshold 4, e.g., to be 0. In other words, in the high throughput mode, the first and second coding passes of each position of each subblock of a coding block may be skipped, such that the context-coded bins coded during the first and second coding passes may not be coded. As a result, each coding block may be coded using only bypass-coded bins in the high throughput mode.

As shown in FIG. 10A, for each coding block, application of the bypass bit-alignment may be invoked before sb_coded_flag, for example, by setting the value of ivlCurrRange to be 256, as part of the high throughput mode, such that all bypass-coded bins may be bit-aligned to allow shift operation and parallel processing. As shown in FIG. 10A, the high throughput mode may be enabled at the coding block level, and the bypass bit-alignment may be invoked 3 times for three coding blocks corresponding to a transform unit.

Figure 10B:
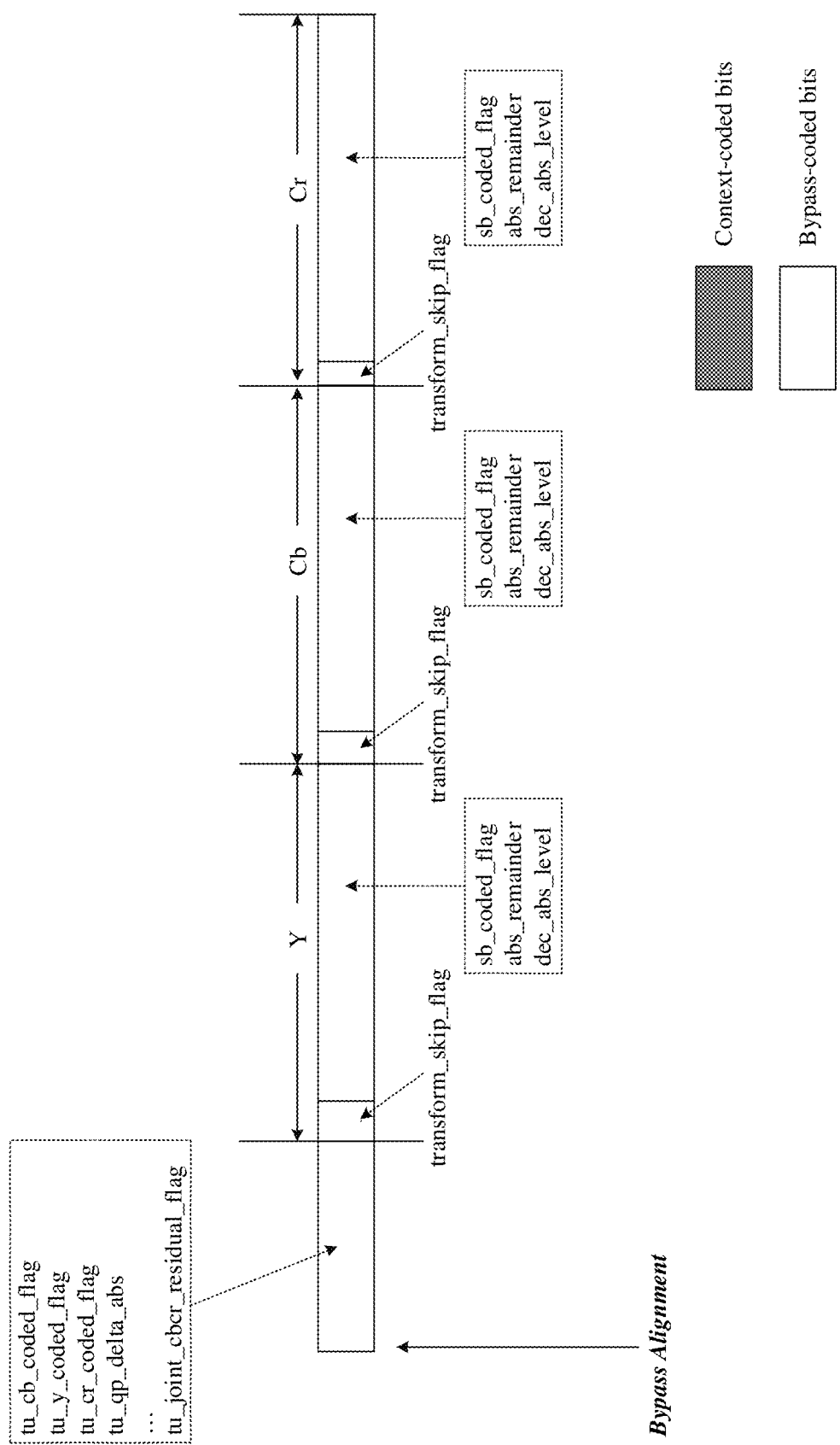
FIG. 10B illustrates an exemplary bypass alignment scheme in TU coding and TSRC, according to some embodiments of the present disclosure.

FIG. 10B illustrates another exemplary bypass alignment scheme in TSRC, according to some embodiments of the present disclosure. Different from the bypass alignment scheme in FIG. 10A, in the bypass alignment scheme of FIG. 10B further changes transform unit bins of the transform unit from context-coded bins to bypass-code bins, such that all the transform unit bins of the transform unit are coded as bypass-code bins as well in the high throughput mode. For example, in the high throughput mode, besides transform_skip_flags, tu_cb_coded_flag, tu_cr_coded_flag, tu_y_coded_flag, cu_qp_delta_abs, cu_chroma_qp_offset_flag, cu_chroma_qp_offset_idx, tu_joint_cbcr_residual_flag, and transform_skip_flags may be changed from context-coded bins to bypass-coded bins. As a result, the transform unit and three corresponding coding blocks may be coded using only bypass-coded bins in the high throughput mode in FIG. 10B.

As shown in FIG. 10B, for each transform unit, application of the bypass bit-alignment may be invoked before the first one of the transform unit bins, such as tu_cb_coded_flag, for example, by setting the value of ivlCurrRange to be 256, as part of the high throughput mode, such that the bypass bit-alignment may only be invoked once for each transform unit. For example, the bypass bit-alignment may be applied at the beginning of the bitstream of the transform unit.

Compared with the scheme in FIG. 10A, the scheme in FIG. 10B can further improve the throughput of video coding by coding the transform unit bins as only bypass-coded bins to avoid any switch between context coding and bypass coding by the CABAC coding engine when coding the transform unit. The high throughput mode may be enabled at the transform unit level.

Figure 11:
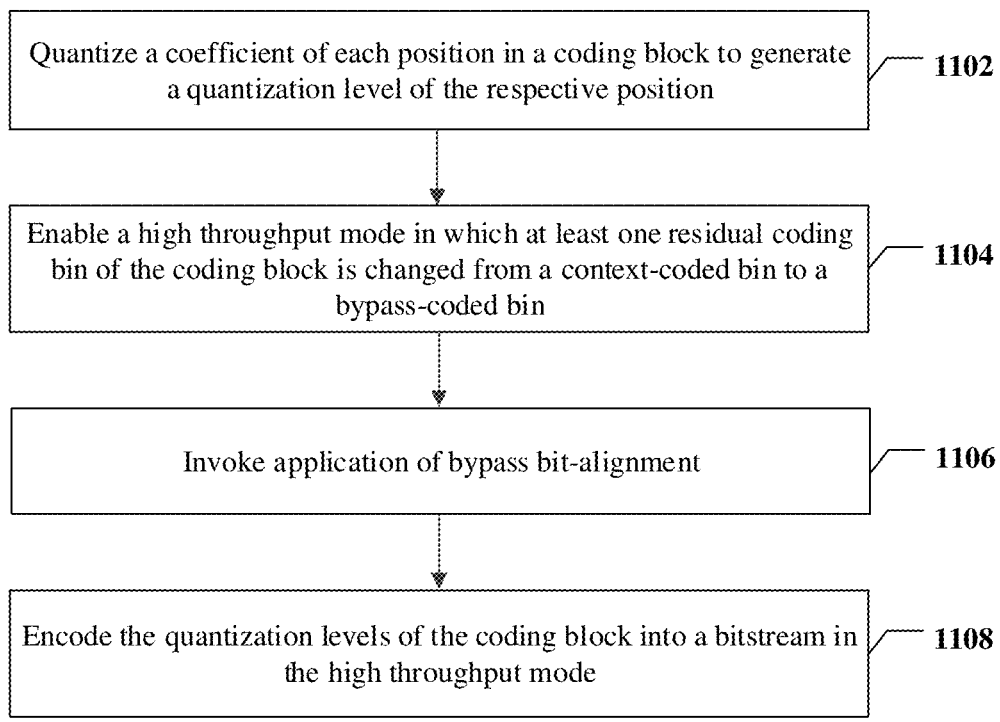
FIG. 11 illustrates a flow chart of an exemplary method of video encoding, according to some embodiments of the present disclosure.

FIG. 11 illustrates a flow chart of an exemplary method 1100 of video encoding, according to some embodiments of the present disclosure. Method 1100 may be performed at the coding block level by encoder 101 of encoding system 100 or any other suitable video encoding systems. Method 1100 may include operations 1102, 1104, 1106, and 1108, as described below. It is understood that some of the operations may be optional, and some of the operations may be performed simultaneously, or in a different order than shown in FIG. 11.

At operation 1102, a coefficient of each position in a coding block is quantized to generate a quantization level of the respective position. For example, as shown in FIG. 3, quantization module 310 may be configured to quantize the coefficient of the current position in the current coding block to generate the quantization level of the current position. In some embodiments, the coding block includes a plurality of subblocks. The coding block may be a transform block encoded using RRC or a transform skip block encoded using TSRC.

At operation 1104, a high throughput mode is enabled. In the high throughput mode, at least one residual coding bin of the coding block is changed from a context-coded bin to a bypass-coded bin, and bypass bit-alignment is applied. For example, as shown in FIG. 3, encoding module 320 may be configured to enable the high throughput mode. In one example, a high throughput mode enable flag (sps_high_throughput_mode_enabled_flag) may be added as a new sequence parameter set (sps) range extension syntax used to indicate whether the high throughput mode is enabled. For example, sps_high_throughput_mode_enabled_flag equal to 1 may specify that the high throughput mode is enabled, while sps_high_throughput_mode_enabled_flag equal to 0 may specify that the high throughput mode is not enabled. When not present, the value of sps_high_throughput_mode_enabled_flag may be inferred to be equal to 0.

Various changes may be made in response to enabling the high throughput mode. In some embodiments, at least one residual coding bin of the coding block is changed from a context-coded bin to a bypass-coded bin in the high throughput mode. In one example in which the coding block is a transform block encoded using RRC, the residual coding bin that is changed from a context-coded bin to a bypass-coded bin may include a coded subblock flag. For example, as shown in FIG. 9A, sb_coded_flag may be changed from a context-coded bin to a bypass-coded bin when sps_high_throughput_mode_enabled_flag equals 1. In another example in which the coding block is a transform block encoded using RRC, the residual coding bin that is changed from a context-coded bin to a bypass-coded bin may further include a last significant coefficient prefix. For example, as shown in FIGS. 9B-9D, last_sig_coeff_x_prefix and last_sig_coeff_y_prefix may be changed from context-coded bins to bypass-coded bins as well when sps_high_throughput_mode_enabled_flag equals 1. In still another example in which the coding block is a transform skip block encoded using TSRC, the residual coding bin that is changed from a context-coded bin to a bypass-coded bin may include a coded subblock flag and/or a coefficient sign flag. For example, as shown in FIGS. 10A and 10B, sb_coded_flag and coeff_sign_flag may be changed from context-coded bins to bypass-coded bins when sps_high_throughput_mode_enabled_flag equals 1.

In some embodiments, a value of remaining context-coded bins (e.g., a counter) is set to be less than a threshold in the high throughput mode. For example, the threshold may equal 4, and the value of remaining context-coded bins may be set to be 0. As a result, coding any context-coded bin for each position of each subblock may be skipped in the high throughput mode. In one example in which the coding block is a transform block encoded using RRC, the variable remBinsPass1 may be set to be 0 to skip the first coding pass that involves coding of all context-coded bins: significance flag (sig_coeff_flag), greater than 1 flag (abs_level_gtx_flag[n][0]), parity flag (par_level_flag), and greater than flag (abs_level_gtx_flag[n][1]) for each position of each subblock, as shown in FIGS. 8A and 9A-9D. In another example in which the coding block is a transform skip block encoded using TSRC, the variable RemCcbs may be set to be 0 to skip the first and second coding passes that involve coding of all context-coded bins: significance flag (sig_coeff_flag), coefficient sign flag (coeff_sign_flag), greater than flags (abs_level_gtx_flag[n][j]), and parity flag (par_level_flag) for each position of each subblock, as shown in FIGS. 8B, 10A, and 10B.

In some embodiments, bypass bit-alignment is also applied in the high throughput mode. At operation 1106, the application of the bypass bit-alignment is invoked. For example, as shown in FIG. 3, encoding module 320 may be configured to invoke the bypass bit-alignment. A value of a current interval length (ivlCurrRange) can be set to be 256 to apply the bypass bit-alignment in the high throughput mode. In some embodiments, the bypass bit-alignment is applied at the coding block level. In one example in which the residual coding bin that is changed from a context-coded bin to a bypass-coded bin includes a coded subblock flag in RRC, application of the bypass bit-alignment may be invoked after coding the last significant coefficient prefix and before coding the coded subblock flag, for example, as shown in FIG. 9A. In another example in which the residual coding bin that is changed from a context-coded bin to a bypass-coded bin further includes a last significant coefficient prefix in RRC, application of the bypass bit-alignment may be invoked before coding the last significant coefficient prefix, for example, as shown in FIG. 9B. In still one example in which the residual coding bin that is changed from a context-coded bin to a bypass-coded bin includes a coded subblock flag and/or a coefficient sign flag in TSRC, application of the bypass bit-alignment may be invoked before coding the coded subblock flag, for example, as shown in FIG. 10A. For example, when sps_high_throughput_mode_enabled_flag is equal to 1, the request for a value of a syntax element may be for the first bypass decoding syntax element in TSRC either sb_coded_flag or abs_remainder, or for the first bypass decoding syntax element in RRC either last_sig_coeff_x_suffix, or last_sig_coeff_y_suffix or dec_abs_level, in a coding block, the bypass bit-alignment may be invoked.

In some embodiments, bypass bit-alignment may be invoked by a process that has the variable ivlCurrRange as the input and the updated variable ivlCurrRange as the output. For coding block level alignment, this process may be applied prior to the bypass coding of last_sig_coeff_x_suffix, or last_sig_coeff_y_suffix, or dec_abs_level, or sb_coded_flag, or abs_remainder. When ivlCurrRange is 256, the offset interval (ivlOffset) and the bitstream may be considered as a shift register, and the decoded value of a variable (binVal) as the register's second most significant bit (the most significant bit is always 0 due to the restriction of ivlOffset being less than ivlCurrRange).

At operation 1108, the quantization levels of the coding block are encoded into a bitstream in the high throughput mode. As shown in FIG. 3, encoding module 320 may be configured to encode the quantization level of each position in the high throughput mode as described above in detail using binary arithmetic coding, for example, CABAC. In some embodiments, each of residual coding bins of the coding block is coded as bypass-coded bins in the high throughput mode.

Figure 12:
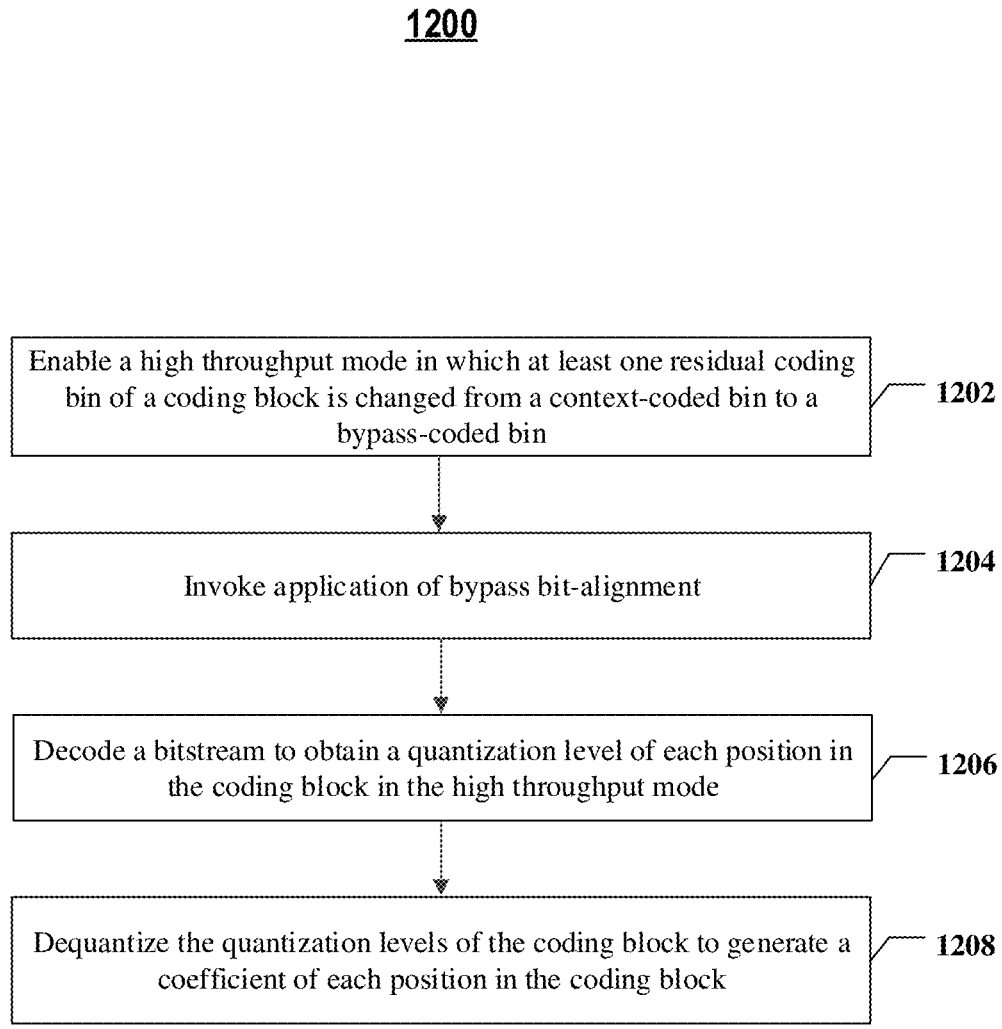
FIG. 12 illustrates a flow chart of an exemplary method of video decoding, according to some embodiments of the present disclosure.

FIG. 12 illustrates a flow chart of an exemplary method 1200 of video decoding, according to some embodiments of the present disclosure. Method 1200 may be performed at the coding block level by decoder 201 of decoding system 200 or any other suitable video decoding systems. Method 1200 may include operations 1202, 1204, 1206, and 1208 as described below. It is understood that some of the operations may be optional, and some of the operations may be performed simultaneously, or in a different order than shown in FIG. 12.

At operation 1202, a high throughput mode is enabled. In the high throughput mode, at least one residual coding bin of a coding block is changed from a context-coded bin to a bypass-coded bin, and bypass bit-alignment is applied. For example, as shown in FIG. 4, decoding module 402 may be configured to enable the high throughput mode. In one example, a high throughput mode enable flag (sps_high_throughput_mode_enabled_flag) may be added as a new sequence parameter set (sps) range extension syntax used to indicate whether the high throughput mode is enabled. For example, sps_high_throughput_mode_enabled_flag equal to 1 may specify that the high throughput mode is enabled, while sps_high_throughput_mode_enabled_flag equal to 0 may specify that the high throughput mode is not enabled. When not present, the value of sps_high_throughput_mode_enabled_flag may be inferred to be equal to 0. The high throughput mode for video decoding at the coding block level may be the same as the high throughput mode for video encoding, as described above in detail.

In some embodiments, bypass bit-alignment is also applied in the high throughput mode. At operation 1204, the application of the bypass bit-alignment is invoked. For example, as shown in FIG. 4, decoding module 402 may be configured to invoke the bypass bit-alignment. A value of a current interval length (ivlCurrRange) can be set to be 256 to apply the bypass bit-alignment in the high throughput mode. In some embodiments, the bypass bit-alignment is applied at the coding block level. In one example in which the residual coding bin that is changed from a context-coded bin to a bypass-coded bin includes a coded subblock flag in RRC, application of the bypass bit-alignment may be invoked after the last significant coefficient prefix and before the coded subblock flag, for example, as shown in FIG. 9A. In another example in which the residual coding bin that is changed from a context-coded bin to a bypass-coded bin further includes a last significant coefficient prefix in RRC, application of the bypass bit-alignment may be invoked before the last significant coefficient prefix, for example, as shown in FIG. 9B. In still one example in which the residual coding bin that is changed from a context-coded bin to a bypass-coded bin includes a coded subblock flag and/or a coefficient sign flag in TSRC, application of the bypass bit-alignment may be invoked before the coded subblock flag, for example, as shown in FIG. 10A. For example, when sps_high_throughput_mode_enabled_flag is equal to 1, the request for a value of a syntax element may be for the first bypass decoding syntax element in TSRC either sb_coded_flag or abs_remainder, or for the first bypass decoding syntax element in RRC either last_sig_coeff_x_suffix, or last_sig_coeff_y_suffix or dec_abs_level, in a coding block, the bypass bit-alignment may be invoked.

In some embodiments, bypass bit-alignment may be invoked by a process that has the variable ivlCurrRange as the input and the updated variable ivlCurrRange as the output. For coding block level alignment, this process may be applied prior to the bypass coding of last_sig_coeff_x_suffix, or last_sig_coeff_y_suffix, or dec_abs_level, or sb_coded_flag, or abs_remainder. When ivlCurrRange is 256, the offset interval (ivlOffset) and the bitstream may be considered as a shift register, and the decoded value of a variable (binVal) as the register's second most significant bit (the most significant bit is always 0 due to the restriction of ivlOffset being less than ivlCurrRange). That is, the bitstream can be decoded by a shift operation after application of the bypass bit-alignment.

At operation 1206, a bitstream is decoded to obtain a quantization level of each position in the coding block in the high throughput mode. As shown in FIG. 4, decoding module 402 may be configured to decode bitstream to obtain the quantization level of each position in the high throughput mode as described above in detail using binary arithmetic coding, for example, CABAC.

At operation 1208, the quantization levels of the coding block are dequantized to generate a coefficient of each position in the coding block. As shown in FIG. 4, dequantization module 404 may be configured to dequantize the quantization level of each position to generate the coefficient of the respective position in the coding block.

Figure 13:
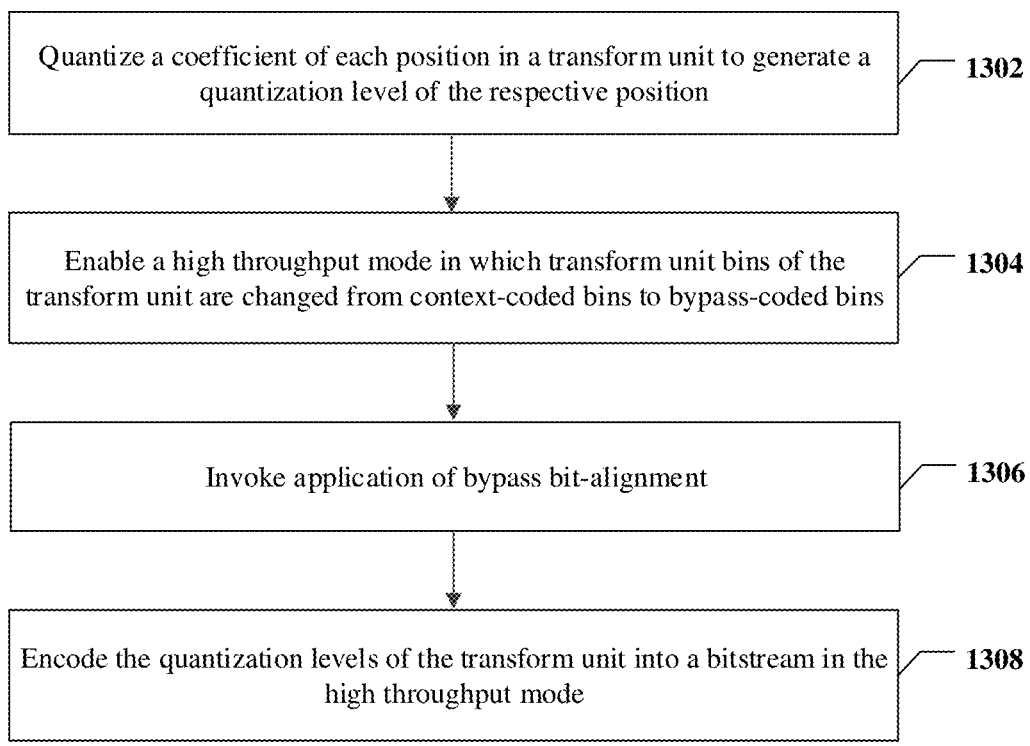
FIG. 13 illustrates a flow chart of another exemplary method of video encoding, according to some embodiments of the present disclosure.

FIG. 13 illustrates a flow chart of another exemplary method 1300 of video encoding, according to some embodiments of the present disclosure. Method 1300 may be performed at the transform unit level by encoder 101 of encoding system 100 or any other suitable video encoding systems. Method 1300 may include operations 1302, 1304, 1306, and 1308, as described below. It is understood that some of the operations may be optional, and some of the operations may be performed simultaneously, or in a different order than shown in FIG. 13.

At operation 1302, a coefficient of each position in a transform unit is quantized to generate a quantization level of the respective position. For example, as shown in FIG. 3, quantization module 310 may be configured to quantize the coefficient of the current position in the current transform unit to generate the quantization level of the current position. In some embodiments, the transform unit includes a coding block.

At operation 1304, a high throughput mode is enabled. In the high throughput mode, transform unit bins of the transform unit are changed from context-coded bins to bypass-coded bins, and bypass bit-alignment is applied. For example, as shown in FIG. 3, encoding module 320 may be configured to enable the high throughput mode. In one example, a high throughput mode enable flag (sps_high_throughput_mode_enabled_flag) may be added as a new sequence parameter set (sps) range extension syntax used to indicate whether the high throughput mode is enabled. For example, sps_high_throughput_mode_enabled_flag equals 1 may specify that the high throughput mode is enabled, while sps_high_throughput_mode_enabled_flag equals 0 may specify that the high throughput mode is not enabled. When not present, the value of sps_high_throughput_mode_enabled_flag may be inferred to be equal to 0.

In some embodiments, the transform unit bins that are changed from context-coded bins to bypass-coded bins may include a coded Cb transform block flag (tu_cb_coded_flag), a coded Cr transform block flag (tu_cr_coded_flag), a coded luma transform block flag (tu_y_coded_flag), a quantization parameter delta value (cu_qp_delta_abs), a chroma quantization parameter offset flag (cu_chroma_qp_offset_flag), a chroma quantization parameter offset index (cu_chroma_qp_offset_idx), a joint chroma flag (tu_joint_cbcr_residual_flag), and transform skip flags (transform_skip_flag). For example, as shown in FIGS. 9D and 10B, tu_cb_coded_flag, tu_cr_coded_flag, tu_y_coded_flag, cu_qp_delta_abs, cu_chroma_qp_offset_flag, cu_chroma_qp_offset_idx, tu_joint_cbcr_residual_flag, and transform_skip_flag may be changed from context-coded bins to bypass-coded bins when sps_high_throughput_mode_enabled_flag equals to 1.

In some embodiments, bypass bit-alignment is also applied in the high throughput mode. At operation 1306, the application of the bypass bit-alignment is invoked. For example, as shown in FIG. 3, encoding module 320 may be configured to invoke the bypass bit-alignment. A value of a current interval length (ivlCurrRange) can be set to be 256 to apply the bypass bit-alignment in the high throughput mode. In some embodiments, the bypass bit-alignment is applied at the transform unit level. In one example, the application of the bypass bit-alignment may be invoked before coding the first one of the transform unit bins, for example, as shown in FIGS. 9D and 10B. For example, when sps_high_throughput_mode_enabled_flag is equal to 1, the request for a value of a syntax element may be for the first bypass decoding syntax element in a transform unit either tu_cb_coded_flag or tu_y_coded_flag, the bypass bit-alignment may be invoked.

In some embodiments, bypass bit-alignment may be invoked by a process that has the variable ivlCurrRange as the input and the updated variable ivlCurrRange as the output. For transform unit level alignment, this process may be applied prior to the bypass coding of tu_cb_coded_flag or tu_y_coded_flag. When ivlCurrRange is 256, the offset interval (ivlOffset) and the bitstream may be considered as a shift register, and the decoded value of a variable (binVal) as the register's second most significant bit (the most significant bit is always 0 due to the restriction of ivlOffset being less than ivlCurrRange).

At operation 1308, the quantization levels of the transform unit are encoded into a bitstream in the high throughput mode. As shown in FIG. 3, encoding module 320 may be configured to encode the quantization level of each position in the high throughput mode as described above in detail using binary arithmetic coding, for example, CABAC. In some embodiments, each of transform unit bins of the transform unit is coded as bypass-coded bins in the high throughput mode.

It is understood that methods 1100 and 1300 may be combined in some examples such that the high throughput mode may be enabled at both the transform unit level and the corresponding coding block level, for example, as described above with respect to FIGS. 9D and 10B.

Figure 14:
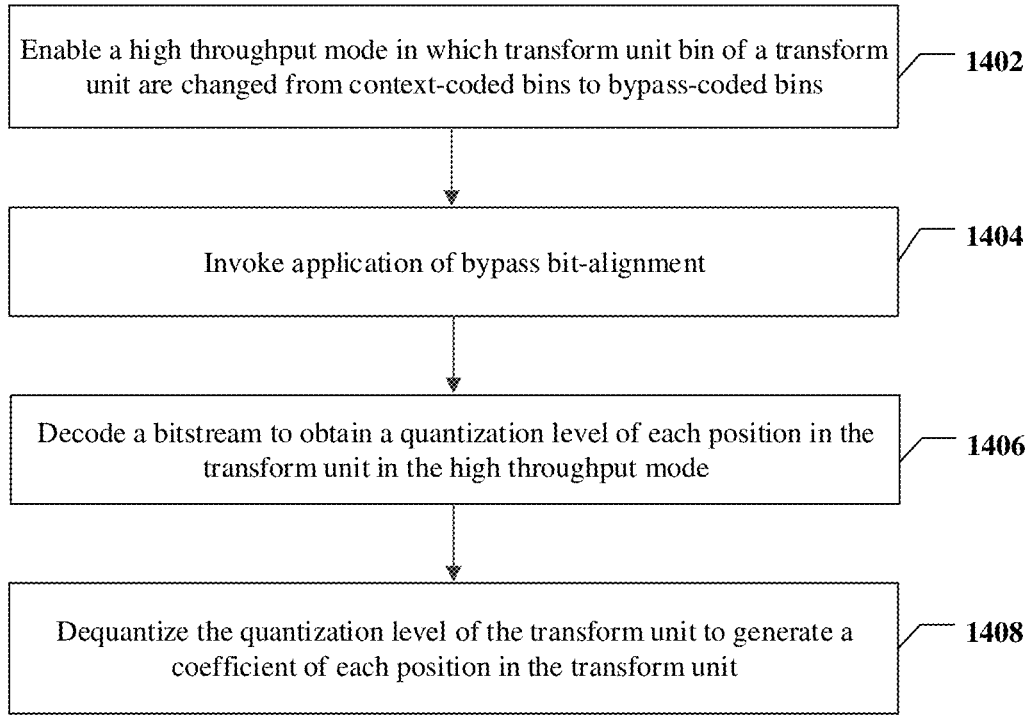
FIG. 14 illustrates a flow chart of another exemplary method of video decoding, according to some embodiments of the present disclosure.

FIG. 14 illustrates a flow chart of an exemplary method 1400 of video decoding, according to some embodiments of the present disclosure. Method 1400 may be performed at the transform unit level by decoder 201 of decoding system 200 or any other suitable video decoding systems. Method 1400 may include operations 1402, 1404, 1406, and 1408 as described below. It is understood that some of the operations may be optional, and some of the operations may be performed simultaneously, or in a different order than shown in FIG. 14.

At operation 1402, a high throughput mode is enabled. In the high throughput mode, transform unit bins of a transform unit are changed from context-coded bins to bypass-coded bins, and bypass bit-alignment is applied. For example, as shown in FIG. 4, decoding module 402 may be configured to enable the high throughput mode. In one example, a high throughput mode enable flag (sps_high_throughput_mode_enabled_flag) may be added as a new sequence parameter set (sps) range extension syntax used to indicate whether the high throughput mode is enabled. For example, sps_high_throughput_mode_enabled_flag equals 1 may specify that the high throughput mode is enabled, while sps_high_throughput_mode_enabled_flag equals 0 may specify that the high throughput mode is not enabled. When not present, the value of sps_high_throughput_mode_enabled_flag may be inferred to be equal to 0. The high throughput mode for video decoding at the transform unit level may be the same as the high throughput mode for video encoding, as described above in detail.

In some embodiments, bypass bit-alignment is also applied in the high throughput mode. At operation 1404, the application of the bypass bit-alignment is invoked. For example, as shown in FIG. 4, decoding module 402 may be configured to invoke the bypass bit-alignment. A value of a current interval length (ivlCurrRange) can be set to be 256 to apply the bypass bit-alignment in the high throughput mode. In some embodiments, the bypass bit-alignment is applied at the transform unit level. In one example, the application of the bypass bit-alignment may be invoked before coding the first one of the transform unit bins, for example, as shown in FIGS. 9D and 10B. For example, when sps_high_throughput_mode_enabled_flag is equal to 1, the request for a value of a syntax element may be for the first bypass decoding syntax element in a transform unit either tu_cb_coded_flag or tu_y_coded_flag, the bypass bit-alignment may be invoked.

In some embodiments, bypass bit-alignment may be invoked by a process that has the variable ivlCurrRange as the input and the updated variable ivlCurrRange as the output. For transform unit level alignment, this process may be applied prior to the bypass coding of tu_cb_coded_flag or tu_y_coded_flag. When ivlCurrRange is 256, the offset interval (ivlOffset) and the bitstream may be considered as a shift register, and the decoded value of a variable (binVal) as the register's second most significant bit (the most significant bit is always 0 due to the restriction of ivlOffset being less than ivlCurrRange).

At operation 1406, a bitstream is decoded to obtain a quantization level of each position in the transform unit in the high throughput mode. As shown in FIG. 4, decoding module 402 may be configured to decode bitstream to obtain the quantization level of each position in the high throughput mode as described above in detail using binary arithmetic coding, for example, CABAC.

At operation 1408, the quantization levels of the coding block are dequantized to generate a coefficient of each position in the transform unit. As shown in FIG. 4, dequantization module 404 may be configured to dequantize the quantization level of each position to generate the coefficient of the respective position in the transform unit.

It is understood that methods 1200 and 1400 may be combined in some examples such that the high throughput mode may be enabled at both the transform unit level and the corresponding coding block level, for example, as described above with respect to FIGS. 9D and 10B.

It is understood that any suitable additional changes may be made in the high throughput mode as well. A Rice parameter may be used to control how to binarize the remainder in residual coding. For a given level, an appropriate Rice parameter can binarize the value with the least number of bins. For example, the value of a variable (StatCoeff) may be dependent on the value of level and used to derive the Rice parameter. A larger value of StatCoeff may map to a larger Rice parameter. In the high throughput mode, there may be many large levels to be coded. Thus, StatCoeff should be set larger in the high throughput mode. For example, a fixed offset 2 may be added in the following formula:

```
if( sb_coded_flag[ xS ][ yS ] ) {
    dec_abs_level[ n ]
    if( updateHist && dec_abs_level[ n ] > 0 ) {
        StatCoeff[ cIdx ] = ( StatCoeff[ cIdx ] +
            Floor(   Log2(   dec_abs_level[n]   )   )   +
sps_high_throughput_mode_enabled_flag ? 2 : 0) >> 1
        updateHist = 0
    }
}.
```

In some embodiments, any other suitable context-coded bins besides the context-coded bins of transform unit and coding block as described above may be changed to bypass-coded bins as well in the high throughput mode. Those context-coded bins may include, for example, motion vector difference bins, such as abs_mvd_greater0_flag, abs_mvd_greater1_flag, abs_mvd_minus2, and mvd_sign_flag. Other possible context-coded bins that can be changed to bypass-code bins in the high throughput mode may include, for example, alf_ctb_flag, alf_use_aps_flag, alf_ctb_filter_alt_idx, alf_ctb_filter_alt_idx, alf_ctb_cc_cr_idc, alf_ctb_cc_cb_idc, sao_merge_left_flag, sao_merge_up_flag, sao_type_idx_chroma, sao_type_idx_luma, split_cu_flag, split_qt_flag, mtt_split_cu_vertical_flag, mtt_split_cu_binary_flag, non_inter_flag, cu_skip_flag, pred_mode_flag, pred_mode_ibc_flag, pred_mode_plt_flag, cu_act_enabled_flag, intra_bdpcm_luma_flag, intra_bdpcm_luma_dir_flag, intra_mip_flag, intra_luma_ref_idx, intra_subpartitions_mode_flag, intra_subpartitions_split_flag, intra_luma_mpm_flag, intra_luma_not_planar_flag, intra_bdpcm_chroma_flag, intra_bdpcm_chroma_dir_flag, cclm_mode_flag, cclm_mode_idx, intra_chroma_pred_mode, palette_transpose_flag, copy_above_palette_indices_flag, run_copy_flag, general_merge_flag, regular_merge_flag, mmvd_merge_flag, mmvd_cand_flag, mmvd_distance_idx, merge_subblock_flag, merge_subblock_idx, ciip_flag, merge_idx, merge_gpm_idx0, merge_gpm_idx1, inter_pred_idc, inter_affine_flag, cu_affine_type_flag, sym_mvd_flag, ref_idx_l0, ref_idx_l1, mvp_l0_flag, mvp_l1_flag, amvr_flag, amvr_precision_idx, bcw_idx, cu_coded_flag, cu_sbt_flag, cu_sbt_quad_flag, cu_sbt_horizontal_flag, cu_sbt_pos_flag, lfnst_idx, mts_idx, and abs_mvd_greater0_flag, abs_mvd_greater1_flag.

In some embodiments, the application of the bypass bit-alignment is invoked before the first bypass-coded bin after any context-coded bin so that the bypass alignment always happens at the beginning of the coding o the first bypass-coded bin.

In various aspects of the present disclosure, the functions described herein may be implemented in hardware, software, firmware, or any combination thereof. If implemented in software, the functions may be stored as instructions on a non-transitory computer-readable medium. Computer-readable media includes computer storage media. Storage media may be any available media that can be accessed by a processor, such as processor 102 in FIGS. 1 and 2. By way of example, and not limitation, such computer-readable media can include RAM, ROM, EEPROM, CD-ROM or other optical disk storage, HDD, such as magnetic disk storage or other magnetic storage devices, Flash drive, SSD, or any other medium that can be used to carry or store desired program code in the form of instructions or data structures and that can be accessed by a processing system, such as a mobile device or a computer. Disk and disc, as used herein, includes CD, laser disc, optical disc, digital video disc (DVD), and floppy disk where disks usually reproduce data magnetically, while discs reproduce data optically with lasers. Combinations of the above should also be included within the scope of computer-readable media.

According to one aspect of the present disclosure, a method for encoding a picture of a video including a coding block is disclosed. A coefficient of each position in the coding block to is quantized by a processor to generate a quantization level of the respective position. A high throughput mode is enabled. In the high throughput mode, at least one residual coding bin of the coding block is changed from a context-coded bin to a bypass-coded bin, and bypass bit-alignment is applied. The quantization levels of the coding block are encoded by the processor into a bitstream in the high throughput mode.

In some embodiments, a value of remaining context-coded bins is set to be less than a threshold.

In some embodiments, the threshold equals 4, and the value of remaining context-coded bins is set to be 0.

In some embodiments, the coding block includes a plurality of subblocks. In some embodiments, to encoding, coding a context-coded bin is skipped for each of the subblocks.

In some embodiments, a value of a current interval length is set to be 256 to apply the bypass bit-alignment in the high throughput mode.

In some embodiments, the coding block is a transform block encoded using RRC.

In some embodiments, the residual coding bin includes a coded subblock flag.

In some embodiments, application of the bypass bit-alignment is invoked after coding a last significant coefficient prefix and before coding the coded subblock flag.

In some embodiments, the residual coding bin further includes a last significant coefficient prefix.

In some embodiments, invoking application of the bypass bit-alignment is invoked before coding the last significant coefficient prefix.

In some embodiments, the coding block is a transform skip block encoded using TSRC.

In some embodiments, the residual coding bin includes at least one of a coded subblock flag or a coefficient sign flag.

In some embodiments, application of the bypass bit-alignment is involved before coding the coded subblock flag.

According to another aspect of the present disclosure, a system for encoding a picture of a video including a coding block includes a memory configured to store instructions and a processor coupled to the memory. The processor is configured to, upon executing the instructions, quantize a coefficient of each position in the coding block to generate a quantization level of the respective position. The processor is also configured to, upon executing the instructions, enable a high throughput mode. In the high throughput mode, at least one residual coding bin of the coding block is changed from a context-coded bin to a bypass-coded bin, and bypass bit-alignment is applied. The processor is further configured to, upon executing the instructions, encode the quantization levels of the coding block into a bitstream in the high throughput mode.

In some embodiments, the processor is further configured to set a value of remaining context-coded bins to be less than a threshold.

In some embodiments, the threshold equals 4, and the value of remaining context-coded bins is set to be 0.

In some embodiments, the coding block includes a plurality of subblocks. In some embodiments, to encode, the processor is further configured to skip coding a context-coded bin for each of the subblocks.

In some embodiments, the processor is further configured to set a value of a current interval length to be 256 to apply the bypass bit-alignment in the high throughput mode.

In some embodiments, the coding block is a transform block encoded using RRC.

In some embodiments, the residual coding bin includes a coded subblock flag.

In some embodiments, the processor is further configured to invoke application of the bypass bit-alignment after coding a last significant coefficient prefix and before coding the coded subblock flag.

In some embodiments, the residual coding bin further includes a last significant coefficient prefix.

In some embodiments, the processor is further configured to invoke application of the bypass bit-alignment before coding the last significant coefficient prefix.

In some embodiments, the coding block is a transform skip block encoded using TSRC.

In some embodiments, the residual coding bin includes at least one of a coded subblock flag or a coefficient sign flag.

In some embodiments, the processor is further configured to invoke application of the bypass bit-alignment before coding the coded subblock flag.

According to still another aspect of the present disclosure, a non-transitory computer-readable medium storing instructions that, when executed by a processor, perform a process for encoding a picture of a video including a coding block is disclosed. The process includes quantizing a coefficient of each position in the coding block to generate a quantization level of the respective position. The process also includes enabling a high throughput mode. In the high throughput mode, at least one residual coding bin of the coding block is changed from a context-coded bin to a bypass-coded bin, and bypass bit-alignment is applied. The process further includes encoding the quantization levels of the coding block into a bitstream in the high throughput mode.

According to yet another aspect of the present disclosure, a method for decoding a picture of a video including a coding block is disclosed. A high throughput mode is enabled. In the high throughput mode, at least one residual coding bin of the coding block is changed from a context-coded bin to a bypass-coded bin, and bypass bit-alignment is applied. A bitstream is decoded by a processor to obtain a quantization level of each position in the coding block in the high throughput mode. The quantization levels of the coding block are dequantized to generate a coefficient of each position in the coding block.

In some embodiments, a value of remaining context-coded bins is set to be less than a threshold.

In some embodiments, the threshold equals 4, and the value of remaining context-coded bins is set to be 0.

In some embodiments, the coding block includes a plurality of subblocks. In some embodiments, coding a context-coded bin is skipped for each of the subblocks.

In some embodiments, a value of a current interval length is set to be 256 to apply the bypass bit-alignment in the high throughput mode.

In some embodiments, the bitstream is decoded by a shift operation after application of the bypass bit-alignment.

In some embodiments, the coding block is a transform block encoded using RRC.

In some embodiments, the residual coding bin includes a coded subblock flag.

In some embodiments, application of the bypass bit-alignment is invoked after a last significant coefficient prefix and before the coded subblock flag.

In some embodiments, the residual coding bin further includes a last significant coefficient prefix.

In some embodiments, application of the bypass bit-alignment is invoked before the last significant coefficient prefix.

In some embodiments, the coding block is a transform skip block encoded using TSRC.

In some embodiments, the residual coding bin includes at least one of a coded subblock flag or a coefficient sign flag.

In some embodiments, application of the bypass bit-alignment is invoked before the coded subblock flag.

According to yet another aspect of the present disclosure, a system for decoding a picture of a video including a coding block includes a memory configured to store instructions and a processor coupled to the memory. The processor is configured to, upon executing the instructions, enable a high throughput mode. In the high throughput mode, at least one residual coding bin of the coding block is changed from a context-coded bin to a bypass-coded bin, and bypass bit-alignment is applied. The processor is also configured to, upon executing the instructions, decode a bitstream to obtain a quantization level of each position in the coding block in the high throughput mode. The processor is further configured to, upon executing the instructions, dequantize the quantization levels of the coding block to generate a coefficient of each position in the coding block.

In some embodiments, a value of remaining context-coded bins is set to be less than a threshold.

In some embodiments, the threshold equals 4, and the value of remaining context-coded bins is set to be 0.

In some embodiments, the coding block includes a plurality of subblocks. In some embodiments, coding a context-coded bin is skipped for each of the subblocks.

In some embodiments, the processor is further configured to set a value of a current interval length to be 256 to apply the bypass bit-alignment in the high throughput mode.

In some embodiments, the bitstream is decoded by a shift operation after application of the bypass bit-alignment.

In some embodiments, the coding block is a transform block encoded using RRC.

In some embodiments, the residual coding bin includes a coded subblock flag.

In some embodiments, the processor is further configured to invoke application of the bypass bit-alignment after a last significant coefficient prefix and before the coded subblock flag.

In some embodiments, the residual coding bin further includes a last significant coefficient prefix.

In some embodiments, the processor is further configured to invoke application of the bypass bit-alignment before the last significant coefficient prefix.

In some embodiments, the coding block is a transform skip block encoded using TSRC.

In some embodiments, the residual coding bin includes at least one of a coded subblock flag or a coefficient sign flag.

In some embodiments, the processor is further configured to invoke application of the bypass bit-alignment before the coded subblock flag.

According to yet another aspect of the present disclosure, a non-transitory computer-readable medium storing instructions that, when executed by a processor, perform a process for decoding a picture of a video including a coding block is disclosed. The process includes enabling a high throughput mode. In the high throughput mode, at least one residual coding bin of the coding block is changed from a context-coded bin to a bypass-coded bin, and bypass bit-alignment is applied. The process also includes decoding a bitstream to obtain a quantization level of each position in the coding block in the high throughput mode. The process further includes dequantizing the quantization levels of the coding block to generate a coefficient of each position in the coding block.

The foregoing description of the embodiments will so reveal the general nature of the present disclosure that others can, by applying knowledge within the skill of the art, readily modify and/or adapt for various applications such embodiments, without undue experimentation, without departing from the general concept of the present disclosure. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

Embodiments of the present disclosure have been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The Summary and Abstract sections may set forth one or more but not all exemplary embodiments of the present disclosure as contemplated by the inventor(s), and thus, are not intended to limit the present disclosure and the appended claims in any way.

Various functional blocks, modules, and steps are disclosed above. The arrangements provided are illustrative and without limitation. Accordingly, the functional blocks, modules, and steps may be reordered or combined in different ways than in the examples provided above. Likewise, some embodiments include only a subset of the functional blocks, modules, and steps, and any such subset is permitted.

The breadth and scope of the present disclosure should not be limited by any of the above-described exemplary embodiments, but should be defined only in accordance with the following claims and their equivalents.

What is claimed is:

1. A method for encoding a picture of a video, the picture comprising a coding block, the method comprising:
    quantizing, by a processor, a coefficient of each position in the coding block to generate a quantization level of the respective position;
    enabling a high throughput mode, wherein in the high throughput mode, at least one residual coding bin of the coding block is changed from a context-coded bin to a bypass-coded bin, and bypass bit-alignment is applied to allow shift operation and parallel processing; and
    encoding, by the processor, the quantization levels of the coding block into a bitstream in the high throughput mode;
    wherein the coding block is a transform block encoded using regular residual coding (RRC), the at least one residual coding bin comprises a coded subblock flag, and the method further comprises:
        invoking application of the bypass bit-alignment after a last significant coefficient prefix and before the coded subblock flag.

2. The method of claim 1, further comprising setting a value of remaining context-coded bins to be less than a threshold.

3. The method of claim 2, wherein the threshold equals 4, and the value of remaining context-coded bins is set to be 0.

4. The method of claim 1, wherein
    the coding block comprises a plurality of subblocks; and
    encoding comprises skipping coding a context-coded bin for each of the subblocks.

5. The method of claim 1, further comprising setting a value of a current interval length to be 256 to apply the bypass bit-alignment in the high throughput mode.

6. A method for decoding a picture of a video, the picture comprising a coding block, the method comprising:
    enabling a high throughput mode, wherein in the high throughput mode, at least one residual coding bin of the coding block is changed from a context-coded bin to a bypass-coded bin, and bypass bit-alignment is applied to allow shift operation and parallel processing;
    decoding, by a processor, a bitstream to obtain a quantization level of each position in the coding block in the high throughput mode; and
    dequantizing, by the processor, the quantization levels of the coding block to generate a coefficient of each position in the coding block;
    wherein the coding block is a transform block encoded using regular residual coding (RRC), the at least one residual coding bin comprises a coded subblock flag, and the method further comprises:
        invoking application of the bypass bit-alignment after a last significant coefficient prefix and before the coded subblock flag.

7. The method of claim 6, wherein a value of remaining context-coded bins is set to be less than a threshold.

8. The method of claim 7, wherein the threshold equals 4, and the value of remaining context-coded bins is set to be 0.

9. The method of claim 6, wherein
    the coding block comprises a plurality of subblocks; and
    coding a context-coded bin is skipped for each of the subblocks.

10. The method of claim 6, further comprising setting a value of a current interval length to be 256 to apply the bypass bit-alignment in the high throughput mode.

11. The method of claim 6, wherein the bitstream is decoded by a shift operation after application of the bypass bit-alignment.

12. The method of claim 6, wherein the at least one residual coding bin further comprises a last significant coefficient prefix.

13. The method of claim 12, further comprising invoking application of the bypass bit-alignment before the last significant coefficient prefix.

14. A system for decoding a picture of a video, the picture comprising a coding block, the system comprising:
    a memory configured to store instructions; and
    a processor coupled to the memory and configured to, upon executing the instructions:
        enable a high throughput mode, wherein in the high throughput mode, at least one residual coding bin of the coding block is changed from a context-coded bin to a bypass-coded bin, and bypass bit-alignment is applied to allow shift operation and parallel processing;

decode a bitstream to obtain a quantization level of each position in the coding block in the high throughput mode; and dequantize the quantization levels of the coding block to generate a coefficient of each position in the coding block;

wherein the coding block is a transform block encoded using regular residual coding (RRC), the at least one residual coding bin comprises a coded subblock flag, and the method further comprises:

invoking application of the bypass bit-alignment after a last significant coefficient prefix and before the coded subblock flag.

15. The system of claim 14, wherein a value of remaining context-coded bins is set to be less than a threshold, wherein the threshold equals 4, and the value of remaining context-coded bins is set to be 0.

16. The system of claim 14, wherein the coding block comprises a plurality of subblocks; and coding a context-coded bin is skipped for each of the subblocks.

17. The system of claim 14, further comprising setting a value of a current interval length to be 256 to apply the bypass bit-alignment in the high throughput mode.

18. The system of claim 14, wherein the bitstream is decoded by a shift operation after application of the bypass bit-alignment.

19. The system of claim 14, wherein the at least one residual coding bin further comprises a last significant coefficient prefix.

20. A non-transitory computer-readable storage medium, storing a computer program and a bitstream, wherein the computer program, when executed by a processor, performs the method for encoding the video of claim 1 to generate the bitstream.

* * * * *